(12) United States Patent
Kok et al.

(10) Patent No.: US 8,547,168 B2
(45) Date of Patent: Oct. 1, 2013

(54) HIGH CURRENT DRIVE SWITCHED CAPACITOR CHARGE PUMP

(75) Inventors: Chi Wah Kok, Hong Kong (CN); Oi Ying Wong, Hong Kong (CN); Wing Shan Tam, Hong Kong (CN)

(73) Assignee: Jen-Ai Holdings, LLC, Wilmington, DE (US)

( * ) Notice: Subject to any disclaimer, the term of this patent is extended or adjusted under 35 U.S.C. 154(b) by 5 days.

(21) Appl. No.: 13/273,675

(22) Filed: Oct. 14, 2011

(65) Prior Publication Data

US 2013/0093503 A1    Apr. 18, 2013

(51) Int. Cl.
*G05F 1/10* (2006.01)

(52) U.S. Cl.
USPC .......................................................... 327/536

(58) Field of Classification Search
USPC ................... 327/530, 534–537, 337; 363/59, 363/60
See application file for complete search history.

(56) References Cited

U.S. PATENT DOCUMENTS

| | | | | |
|---|---|---|---|---|
| 5,272,432 | A | * | 12/1993 | Nguyen et al. ................ 323/315 |
| 5,581,455 | A | * | 12/1996 | Rossi et al. ...................... 363/60 |
| 6,160,723 | A | | 12/2000 | Liu |
| 7,023,260 | B2 | | 4/2006 | Thorp et al. |
| 7,932,770 | B2 | | 4/2011 | Yamahira et al. |
| 2008/0174360 | A1 | | 7/2008 | Hsu |
| 2008/0186081 | A1 | * | 8/2008 | Yamahira et al. .............. 327/536 |
| 2009/0237149 | A1 | * | 9/2009 | Ueda ............................. 327/536 |

OTHER PUBLICATIONS

Dickson, "On-chip high-voltage generation in NMOS integrated circuits using an improved voltage multiplier technique," IEEE Journal of Solid-State Circuits, pp. 374, 378, Jun. 1976.
Moisiadis, et al., "A CMOS charge pump for low voltage operation," Proc. IEEE International Symposium on Circuits and Systems 2000, pp. 577-580, vol. 5, May 2000.
Richelli, et al., "A 1.2V-5V high efficiency CMOS charge pump for non-volatile memories," IEEE International Symposium on Circuits and Systems, 2007. ISCAS 2007, pp. 2411-2414.
Wu, et al. "MOS charge pumps for low voltage operation," IEEE Journal on Solid-State Circuits, pp. 592-597, vol. 33 issue 4, Apr. 1998.
Pelliconi, et al., "Power efficient charge pump in deept submicron standard CMOS technology," IEEE Journal of Solid-State Circuits, pp. 1068-1071, Jun. 2003, 4 pages.
Wang, et al., "Efficiency improvement in charge pump circuits," IEEE Journal on Solid-State Circuits, pp. 852-860, Apr. 1998, 9 pages.

(Continued)

*Primary Examiner* — Lincoln Donovan
*Assistant Examiner* — Sibin Chen
(74) *Attorney, Agent, or Firm* — Turocy & Watson, LLP

(57) ABSTRACT

Systems, methods, and devices that employ a dynamic gate boost component (DGBC) to generate a desired boosted gate voltage to facilitate controlling an enhanced charge pump are presented. An enhanced charge pump can comprise a desired number of charge transfer switches (CTSs) and a desired number of DGBCs, wherein a DGBC can apply a desired boosted gate voltage to the gate of an associated CTS to control switching of the CTS. An auxiliary gate boost component (AGBC) of one circuit path can apply a desired boosted gate voltage to a CTS of another circuit path to control switching of that CTS. The AGBC and DGBC can operate to facilitate maintaining the overdrive voltages of all of the CTSs in the enhanced charge pump so that the overdrive voltages are essentially unchanged under various loading current conditions. Multiple enhanced charge pumps can be cascaded to produce a higher output voltage.

24 Claims, 22 Drawing Sheets

(56) References Cited

OTHER PUBLICATIONS

Cabrini, et al., "Enhanced charge pump for ultra-low-voltage applications," Electronics Letters, pp. 512-514, vol. 42, No. 9, 2006.
Cruz, et al., "A charge pump without overstress for standard CMOS process with improved current driver capability," Proc. IEEE 25th Convention of Electrical and Electronics Engineers in Israel, pp. 618-622, 2008.

Van Steenwijk, et al., "Analysis and design of a charge pump circuit for high output current application," Proc. Nineteenth European Solid-State Circuits Conference, vol. 1, pp. 118-121, 1993.
Pan, et al., "A charge pump circuit without overstress in low-voltage CMOS standard process," Proc. IEEE Conference on Electron Devices and Solid-State Circuits, pp. 501-504, 2007.
Li, et al., "High efficiency four-phase all PMOS charge pump without body effects," Proc. IEEE International Conferences on Communications, Circuits, and Systems 2008, pp. 1083-1087, May 2008.

* cited by examiner

HIGH CURRENT DRIVE SWITCHED CAPACITOR CHARGE PUMP

TECHNICAL FIELD

The subject specification generally relates to electronic circuitry, and, more particularly, a high current drive switched capacitor charge pump.

BACKGROUND 2-phase switched capacitor DC-DC charge pumps are frequently used to generate voltages other than the supply voltage in integrated circuits because of the simple control circuit. This kind of circuit has been widely applied in programming flash memories, driving liquid crystal displays (LCDs), etc., where a high electric field is required. Among various conventional switched capacitor charge pumps, a cross-coupled charge pump structure has been very popular because of its high efficiency. Moreover, such charge pumps can be implemented with a conventional complementary metal-oxide-semiconductor (CMOS) process because the voltage difference between gate, source and drain of the metal-oxide-semiconductor field-effect transistor (MOSFET) does not exceed the supply voltage $V_{DD}$. If desired, a high output voltage can be achieved by cascading the single stage to have multiple cascading stages.

There have been attempts to improve the performance of the cross-coupled charge pump. One conventional implementation adds a voltage doubler circuit to each stage of the cross-coupled charge pump to maintain the overdrive voltages of the charge transfer switches (CTSs) at different loading currents. Such implementation can achieve better driving capability because the overdrive voltages of the N-type metal-oxide-semiconductor (NMOS) CTSs do not degrade at high loading current condition. However, this implementation is also limited to the NMOS transistor CTS of the cross-coupled charge pump, while the P-type metal-oxide-semiconductor (PMOS) transistor CTS(s) of the cross coupled charge pump still suffer from decreased overdrive voltage problem under high loading current condition.

Another conventional implementation makes use of four auxiliary gate voltage boosting circuits in each stage of the cross coupled charge pump to achieve high overdrive voltages for all the CTSs. However, this implementation of the boosting circuits requires large silicon area. Furthermore, the clock signals that drive the boosting circuits are required to have amplitudes equal to $2V_{DD}$, which are required to be generated by a separate voltage doubler circuit. As a result, this conventional implementation is not only silicon inefficient, the additional boosting circuits and voltage doubler circuit for clock signal generation will consume power and decrease the overall efficiency of the charge pump circuit.

Still another conventional implementation for cross coupled charge pumps makes use of four and six phase clock signals to drive the cross coupled charge pump circuits in an effort to achieve improved efficiency under different loading current condition. However, these conventional implementations involve more complicated clock signals, which result in higher the switching losses, higher power consumption, and requires a larger silicon area to implement the control circuit. As a result, a multiple phase control circuit is not in favor for compact and power efficient cross coupled charge pump circuits.

The above-described deficiencies of today's charge pumps are merely intended to provide an overview of some of the problems of conventional systems, devices and methods, and are not intended to be exhaustive. Other problems with the state of the art and corresponding benefits of some of the various non-limiting embodiments may become further apparent upon review of the following detailed description.

SUMMARY

The following presents a simplified summary of the various embodiments in order to provide a basic understanding of some aspects described herein. This summary is not an extensive overview of the disclosed subject matter. It is intended to neither identify key or critical elements of the disclosed subject matter nor delineate the scope of the subject embodiments. Its sole purpose is to present some concepts of the disclosed subject matter in a simplified form as a prelude to the more detailed description that is presented later.

The disclosed subject matter can comprise an enhanced charge pump that can employ a dynamic gate boost component (DGBC) to generate a desired boosted gate voltage to facilitate controlling switching of a subset of power switches (e.g., charge transfer switches (CTSs)) in the enhanced charge pump. In an embodiment, the enhanced charge pump can be an enhanced multi-phase (e.g., 2-phase) cross-coupled, switched-capacitor charge pump. In an aspect, the enhanced charge pump can comprise a desired number (e.g., 4) of CTSs, which can be P-type metal-oxide-semiconductor field-effect transistor (P-MOSFET or PMOS) CTSs) and a desired number (e.g., 2) of DGBCs, wherein there can be a DGBC in each of two circuit paths the enhanced charge pump, and each DGBC can generate and apply a desired boosted gate voltage to the gate of an associated CTS to facilitate controlling switching of the CTS between an off state and on state, during specified time periods, in response to clock signals from a first clock, clk, a second clock, nclk, which can be opposite in phase from the first clock, and/or input voltages from an enhanced charge pump of a previous stage (if any) when the enhanced charge pump is part of an enhanced multi-stage charge pump, as more fully disclosed herein.

In another aspect, a DGBC can comprise a relatively small first type of switch, such as a relatively small PMOS transistor (e.g., PMOS transistor with a width (W) of 2 micrometers (µm) and length (L) of 0.35 µm), and a relatively small second type of switch, which can be, for example, a relatively small N-type MOSFET (NMOS) transistor (e.g., NMOS transistor with a W of 2 µm and L of 0.35 µm), wherein these switches can be employed to facilitate applying a desired gate boosted voltage to the gate of an associated CTS (e.g., PMOS power transistor) in response to received input from a previous stage (e.g., $IN_{ak}$, $IN_{bk}$), clk, or nclk, as more fully disclosed herein. The DGBCs can facilitate maintaining, or at least substantially maintaining, overdrive voltages, of all of the CTSs in the charge pump stage, so that the overdrive voltages remain unchanged, or at least remain substantially the same, under various (e.g., widely varying) loading current conditions, including large loading current (e.g., greater than 60 microamps (µA)), associated with the enhanced charge pump.

In accordance with various embodiments, a charge pump stage also can comprise one or more auxiliary gate boost components (AGBCs), wherein an AGBC can be associated with the CTSs and DGBC in an electronic circuit. In an aspect, there can be an AGBC in each circuit path of the enhanced charge pump. The AGBC of a first circuit path can be employed to facilitate controlling switching of an associated CTS in the second circuit path to facilitate controlling switching of the associated CTS between an off state and on state during specified time periods. In another aspect, an AGBC can comprise a relatively small switch, such as a relatively small PMOS transistor (e.g., PMOS transistor with a W of 2 µm and L of 0.35 µm), a relatively small capacitor (e.g., 1.0 picofarad (pF)), and a diode or another relatively small switch, which can be, for example, a relatively small PMOS transistor (e.g., PMOS transistor with a W of 2 µm and L of 0.35 µm). The structure of these components (e.g., transistor(s), capacitor, and/or diode) and the associated circuitry of the AGBC can be such that the AGBC can facilitate enabling the overdrive voltage of an associated CTS(s) to be maintained at a desired level under various output current loading conditions. For each circuit path of the charge pump stage, an AGBC and a DGBC, operating in conjunction with the each other, can thereby facilitate maintaining the overdrive voltages of all of the CTSs in the enhanced charge pump stage so that the overdrive voltages are essentially unchanged under various (e.g., widely varying) loading current conditions.

In another aspect, the enhanced charge pump can provide a higher voltage (e.g., twice or approximately twice the voltage) at the output of the enhanced charge pump based at least in part on a lower input voltage received at the input of the enhanced charge pump. In still another aspect, multiple enhanced charge pumps can be cascaded together to form an enhanced multi-stage charge pump to facilitate generating a desired higher voltage level at the output of the last stage of the enhanced multi-stage charge pump. When n stages are employed, wherein n can be virtually any desired integer number, an input voltage of $V_{DD}$ in the first enhanced charge pump stage can be increased to provide an output voltage from the last enhanced charge pump stage of $2^n V_{DD}$, or at least approximately $2^n V_{DD}$.

In accordance with various aspects, the disclosed subject matter can include a system that can comprise an enhanced charge pump. In an aspect, the enhanced charge pump can comprise a plurality of CTSs configured to facilitate control of charge being stored in or provided by respective flying capacitors of the enhanced charge pump. In another aspect, the enhanced charge pump can further comprise a DGBC configured to apply a boosted gate voltage to a subset of CTSs of the plurality of CTSs at respective periodic times to facilitate control of switch states of the subset of CTSs.

In accordance with various other aspects, the subject specification can include a method comprising the act of controlling a switching state of a first CTS of a plurality of CTSs of an enhanced charge pump by a DGBC in response to a first voltage level received by the first DGBC. In an aspect, the method can further comprise the act of controlling a switching state of a second CTS of the plurality of CTSs by a second DGBC in response to a second voltage level received by the second DGBC, wherein the controlling of the switching state of the first CTS and the controlling of the switching state of the second CTS facilitates generating a higher output voltage at the output of the enhanced charge pump based at least in part on an input voltage received by the enhanced charge pump, wherein the input voltage is a lower voltage level than the higher output voltage.

In accordance with still other aspects, the subject specification can include an enhanced charge pump that can comprise a plurality of CTSs configured to respectively switch between an off state and an on state to facilitate control of charge being stored in or provided by respective flying capacitors of the enhanced charge pump. In an aspect, the enhanced charge pump can further comprise a DGBC configured to apply a boosted gate voltage to a subset of CTSs of the plurality of CTSs at respective periodic times to respectively switch respective CTSs in the subset of CTSs between the off state and the on state to facilitate generation of respective overdrive voltages associated with the respective CTSs of the subset of CTSs to facilitate maintaining a substantially linear output voltage-to-loading current ratio when the enhanced charge pump is subjected to a loading current of a specified level.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
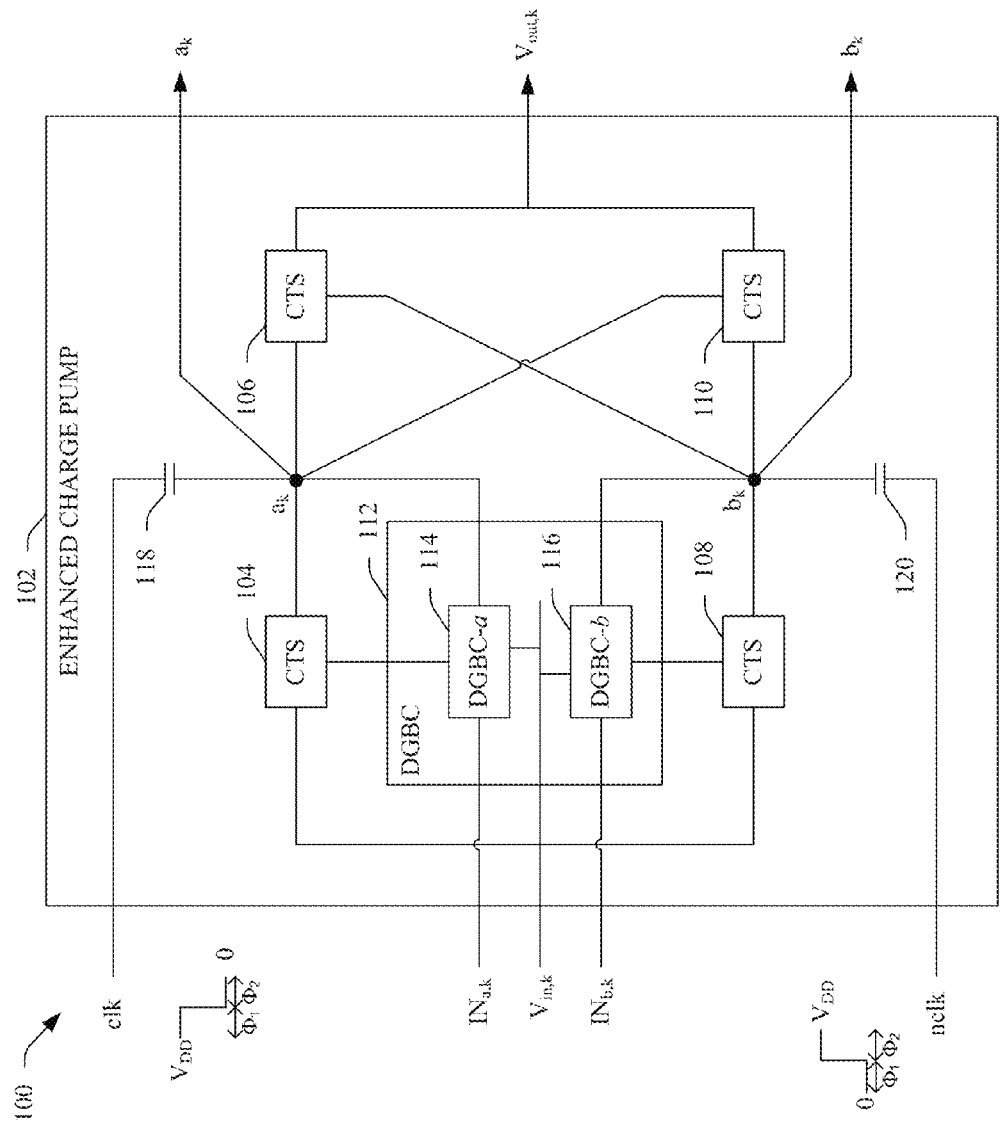
FIG. 1 is a block diagram of an example system comprising an enhanced charge pump that includes dynamic gate boost components (DGBCs) to facilitate improved operation of the enhanced charge pump in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

A charge pump is often applied to generate different levels of DC voltage other than (e.g., greater than) the supply voltage. A charge pump typically contains switches, capacitors, and clocking circuits, and does not require any transformers or inductors. 2-phase switched capacitor DC-DC charge pumps are frequently used to generate voltages other than the supply voltage in integrated circuits because of the simple control circuit. Among various conventional switched capacitor charge pumps, a cross coupled charge pump structure has been very popular because of its high efficiency. Such charge pumps can be implemented with a conventional complementary metal-oxide-semiconductor (CMOS) process because the voltage difference between gate, source and drain of the metal-oxide-semiconductor field-effect transistor (MOSFET) does not exceed the supply voltage $V_{DD}$. If desired, a high output voltage can be achieved by cascading the single stage to have multiple cascading stages.

There have been attempts to improve the performance of the cross coupled charge pump. However, conventional cross coupled charge pumps still have a number of drawbacks. One conventional cross coupled charge pump adds a voltage doubler circuit to each charge pump stage to maintain the overdrive voltages of the charge transfer switches (CTSs) at different loading currents. Such implementation can achieve better driving capability because the overdrive voltages of the N-type MOSFET (NMOS) CTSs do not degrade at high loading current condition. However, this implementation is also limited to the NMOS transistor CTS of the cross coupled charge pump, while the P-type MOSFET (PMOS) transistor CTSs of the cross coupled charge pump still suffer from decreased overdrive voltage problem under high loading current condition. Another conventional cross coupled charge pump employs four auxiliary gate voltage boosting circuits in each charge pump stage to achieve high overdrive voltages for all the CTSs. However, this implementation of the boosting circuits requires large silicon area, and requires the clock signals that drive the boosting circuits to have amplitudes equal to $2V_{DD}$, that must be generated by a separate voltage doubler circuit, and thus, is silicon inefficient, power inefficient, and has a lower overall efficiency. Other conventional cross coupled charge pumps use four and six phase clock signals to drive the cross coupled charge pump circuits in an effort to achieve improved efficiency under different loading current condition. However, such charge pumps involve more complicated clock signals resulting in higher the switching losses, higher power consumption, and larger silicon area requirements to implement the control circuit.

To that end, the disclosed subject matter can comprise systems, methods, and devices that can employ a dynamic gate boost component (DGBC) to generate a desired boosted gate voltage to facilitate controlling operation of an enhanced charge pump (e.g., an enhanced multi-phase (e.g., 2-phase) cross-coupled, switched capacitor charge pump using CMOS technology) are presented. In an aspect, an enhanced charge pump can comprise a desired number of charge transfer switches (CTSs) and a desired number of DGBCs, wherein a DGBC can apply a desired boosted gate voltage to the gate of an associated CTS to control switching of the CTS between an off state and on state. There can be a DGBC (e.g., DGBC-a and DGBC-b) that can be employed for each circuit path of the enhanced charge pump. In another aspect, the enhanced charge pump can include an auxiliary gate boost component (AGBC), wherein an AGBC of one circuit path can apply a desired boosted gate voltage to a CTS of another circuit path to control switching of that CTS between an on state and off state. The AGBC and DGBC can operate to facilitate maintaining the overdrive voltages of all of the CTSs in the enhanced charge pump so that the overdrive voltages are essentially unchanged under various loading current conditions. As a result, the output voltage of the enhanced charge pump can be maintained such that there can be a substantially linear output voltage-to-loading current ratio when the enhanced charge pump is subjected to a loading current of a specified level, even for larger loading current conditions (e.g., greater than 60 microamps). In still another aspect, multiple enhanced charge pumps can be cascaded to produce a higher output voltage. When n stages are employed, wherein n can be virtually any desired integer number, an input voltage of $V_{DD}$ in the first enhanced charge pump stage can be increased to provide an output voltage from the last enhanced charge pump stage of $2^n V_{DD}$, or at least approximately $2^n V_{DD}$.

Referring to the drawings, FIG. 1 is a block diagram of an example system 100 comprising an enhanced charge pump that includes DGBCs to facilitate improved operation of the enhanced charge pump in accordance with various aspects and embodiments of the disclosed subject matter. In an aspect, the system 100 can include an enhanced charge pump 102. In an embodiment, the enhanced charge pump 102 can be a 2-phase cross-coupled, switched-capacitor charge pump. As more fully disclosed herein, the enhanced charge pump 102 that can operate with improved driving performance, as compared to conventional 2-phase cross-coupled switched-capacitor charge pumps.

In one aspect, the enhanced charge pump 102, which can be one unit cell (e.g., one 2-phase cross-coupled switched capacitor charge pump), or the enhanced charge pump 102 can be part of an enhanced multi-stage charge pump comprising n stages, wherein there can be an enhanced charge pump (e.g., 102) in each stage, and wherein n can be virtually any desired integer number. The enhanced charge pump 102 (e.g., at stage k) can include a specified number of CTSs (e.g., power switches), comprising CTS 104, CTS 106, CTS 108, and CTS 110. In an embodiment, the CTS 104, CTS 106, CTS 108, and CTS 110 each can be PMOS transistors. Note that, in comparison to the conventional charge pump, the system 100 can utilize PMOS CTSs 104 and 108 in place of the NMOS CTSs, which are used in conventional charge pumps.

The CTS 104 and CTS 108 each can be connected to an input voltage node $V_{in,k}$ and can receive a voltage (e.g., voltage signal) from a standard voltage source, if the enhanced charge pump 102 is the only charge pump or is the first stage of a plurality of charge pumps in an enhanced multi-stage charge pump; or, if the enhanced charge pump 102 is part of an enhanced multi-stage charge pump but is not the first stage, the input voltage node $V_{in,k}$ can receive the voltage (e.g., power signal) from a power output node $V_{out,k-1}$ of an enhanced charge pump from the previous stage. The CTS 104 (e.g., drain of the CTS 104) also can be connected to a node $a_k$ associated with circuit path a of the enhanced charge pump 102, the CTS 108 (e.g., drain of the CTS 108) also can be connected to a node $b_k$ associated with circuit path b of the enhanced charge pump 102.

The CTS 106 (e.g., source of the CTS 106) can be connected to the node $a_k$, the CTS 110 (e.g., source of the CTS 110) also can be connected to a node $b_k$. The CTS 106 and CTS 110 also can be connected to a output voltage node $V_{out,k}$, wherein the enhanced charge pump 102 can provide a desired output voltage to an electronic device or component and/or can provide the desired output voltage to a next stage of an enhanced multi-stage charge pump. The voltage produced at the output voltage node $V_{out,k}$ typically can be, or can approximately be, twice the voltage level of the voltage received at the input voltage node $V_{in,k}$. In another aspect, the CTS 106 (e.g., gate of the CTS 106) can be connected to the node $b_k$ associated with the other circuit path, circuit path b, wherein switching of the CTS 106 between on and off states can be controlled based at least in part on the voltage level at the node $b_k$, which can be applied to the gate of the CTS 106. In still another aspect, the CTS 110 (e.g., gate of the CTS 110) can be connected to the node $a_k$ associated with the other circuit path, circuit path a, wherein switching of the CTS 110 between on and off states can be controlled based at least in part on the voltage level at the node $a_k$, which can be applied to the gate of the CTS 110.

In yet another aspect, the enhanced charge pump 102 can comprise a DGBC 112 that can be employed to facilitate providing a desired gate voltage, which can be a desirably high boosted gate voltage, to the respective gates of the CTS 104 and CTS 108. The DGBC can comprise a DGBC-a 114 that can be connected to the CTS 104 (e.g., connected to the gate of the CTS 104) and can operate to provide a desired gate voltage, which can be a desirably high boosted gate voltage, to the gate of the CTS 104 during specified periods, wherein the DGBC-a 114 can be associated with circuit path a. The DGBC also can comprise a DGBC-b 116 that can be connected to the CTS 108 (e.g., connected to the gate of the CTS 108) and can operate to provide a desired gate voltage, which can be a desirably high boosted gate voltage, to the gate of the CTS 108 during other specified periods (e.g., time periods opposite in phase to the specified periods associated with the CTS 104), wherein the DGBC-b 116 can be associated with circuit path b.

The DGBC-a 114 can be connected to an input node $IN_{a,k}$, wherein the DGBC-a 114 can receive a voltage signal via the input node $IN_{a,k}$ to facilitate operation of the DGBC-a 114 and associated CTS 104. The voltage signal at the input node $IN_{a,k}$ can be received from a second clock signal (e.g., nclk) when the enhanced charge pump 102 is the only charge pump or is the first enhanced charge pump in an enhanced multi-state charge pump; or, if the enhanced charge pump 102 is part of an enhanced multi-state charge pump and is not the first stage, the voltage signal at the input node $IN_{a,k}$ can be received from a node $a'_k$ (or alternatively node $a_k$ depending on the embodiment of the previous enhanced charge pump) of an enhanced charge pump from the previous stage (e.g., k−1 stage) of the enhanced multi-state charge pump. In another aspect, the DGBC-a 114 can be connected to the node $a_k$ within the enhanced charge pump 102. In still another aspect, during specified periods, the DGBC-a 114 can operate to generate and/or transfer a desirably high gate boost voltage to the gate of the CTS 104 during specified time periods to facilitate controlling switching of the CTS 104 between on and off states. The DGBC-a 114, in part by providing a desirably high gate boost voltage to the CTS 104, can enhance or improve the overdrive voltage of the CTS 104, as compared to the overdrive voltage of a power switch in a conventional charge pump.

The DGBC-b 116 can be connected to an input node $IN_{b,k}$, wherein the DGBC-b 116 can receive a voltage signal via the input node $IN_{b,k}$ to facilitate operation of the DGBC-b 116 and associated CTS 108. The voltage signal at the input node $IN_{b,k}$ can be received from a first clock signal (e.g., clk) when the enhanced charge pump 102 is the only charge pump or is the first enhanced charge pump in an enhanced multi-state charge pump; or, if the enhanced charge pump 102 is part of an enhanced multi-state charge pump and is not the first stage, the voltage signal at the input node $IN_{b,k}$ can be received from a node $b'_k$ (or alternatively node $b_k$ depending on the embodiment of the previous enhanced charge pump) of an enhanced charge pump from the previous stage (e.g., k−1 stage) of the enhanced multi-state charge pump. In another aspect, the DGBC-b 116 can be connected to the node $b_k$ within the enhanced charge pump 102. In still another aspect, during specified periods, the DGBC-b 116 can operate to generate and/or transfer a desirably high gate boost voltage to the gate of the CTS 108 during other specified time periods (e.g., time periods opposite in phase to the specified periods associated with the CTS 104) to facilitate controlling switching of the CTS 108 between on and off states. The DGBC-b 116, in part by providing a desirably high gate boost voltage to the CTS 108, can enhance or improve the overdrive voltage of the CTS 108, as compared to the overdrive voltage of a power switch in a conventional charge pump.

In yet another aspect, the enhanced charge pump 102 can comprise capacitor 118 (e.g., fly capacitor) and capacitor 120

(e.g., fly capacitor), which can be employed to facilitate producing a higher voltage at the output voltage node of the enhanced charge pump 102 than the voltage received at the input voltage node. A first terminal of the capacitor 118 can be connected to node $a_k$, and a second terminal of the capacitor 118 can be connected to the first clock node (clk node). A first terminal of the capacitor 120 can be connected to node $b_k$, and a second terminal of the capacitor 120 can be connected to the second clock node (nclk node).

The first clock signal (e.g., clk) can be opposite in phase in relation to the second clock signal (e.g., nclk). The total clock period can include a first clock period $\Phi_1$ and a second clock period $\Phi_2$. During clock period $\Phi_1$, clk=$V_{DD}$ and nclk=0V. The clock signals in clock period $\Phi_2$ are given by clk=0V and nclk=$V_{DD}$.

During operation of the enhanced charge pump 102, at various times, the capacitor 118 and capacitor 120 can be in charging phase or pumping phase, wherein, during the charging phase, a capacitor is being charged up with a voltage, and during the pumping phase, a capacitor is providing or transferring stored charge to the circuit. During the charging phase in the circuit path a, the capacitor 118 can be charging, and the DGBC-a 114 can operate to transfer the low voltage signal at the input node $IN_{a,k}$ to the gate of the CTS 104, which can switch the CTS 104 to the on state. The low voltage signal at the input node $IN_{a,k}$ can be constant during the charging phase, as more fully disclosed herein. As a result of the operation of the DGBC-a 114, the CTS 104 can have a source-to-gate voltage can be equal to $V_{DD}$ (e.g., the standard voltage level from the voltage source) and can remain constant, or at least substantially constant, regardless of the amount of loading current associated with (e.g., experienced by) the enhanced charge pump 102. During the pumping phase of the capacitor 118, the DGBC-a 114 can operate to transfer the high voltage signal from the node $a_k$ to the gate of the CTS 104, which can switch the CTS 104 to the off state.

With regard to circuit path b, during the charging phase in the circuit path b, the capacitor 120 can be charging, and the DGBC-b 116 can operate to transfer the low voltage signal at the input node $IN_{b,k}$ to the gate of the CTS 108, which can switch the CTS 108 to the on state. The low voltage signal at the input node $IN_{b,k}$ can be constant during the charging phase, as more fully disclosed herein. As a result of the operation of the DGBC-b 116, the CTS 108 can have a source-to-gate voltage can be equal to $V_{DD}$ (e.g., the standard voltage level from the voltage source) and this voltage level can remain constant, or at least substantially constant, regardless of the amount of loading current associated with (e.g., experienced by) the enhanced charge pump 102. During the pumping phase of the capacitor 120, the DGBC-b 116 can operate to transfer the high voltage signal from the node $b_k$ to the gate of the CTS 108, which can switch the CTS 108 to the off state. Employing DGBC-a 114 and DGBC-b 116, the DGBC 112, in part by providing a desirably high gate boost voltage at respective times to the CTSs 104 and 108, respectively, can enhance or improve the overdrive voltage of the CTSs 104 and 108, as compared to the overdrive voltage of a power switch in a conventional charge pump.

Figure 2:
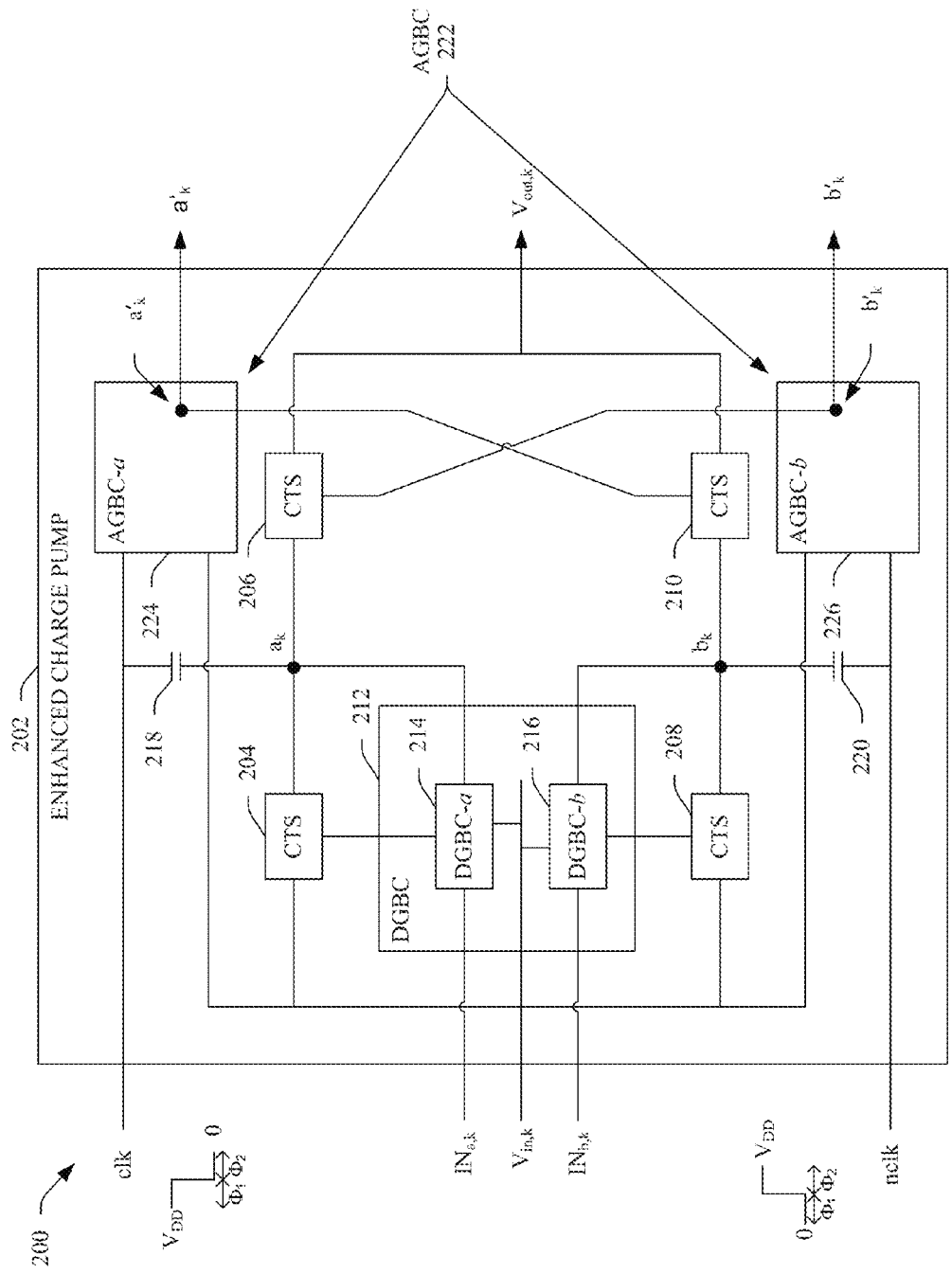
FIG. 2 depicts is a block diagram of an example system comprising an enhanced charge pump that includes DGBCs and auxiliary gate boost components (AGBCs) to facilitate improved operation of the enhanced charge pump in accordance with various aspects and embodiments of the disclosed subject matter.

Referring to FIG. 2, depicted is a block diagram of an example system 200 comprising an enhanced charge pump that includes DGBCs and AGBCs to facilitate improved operation of the enhanced charge pump in accordance with various aspects and embodiments of the disclosed subject matter. In an aspect, the system 200 can include an enhanced charge pump 202 that can be employed to generate and provide a higher voltage at its output voltage node than the voltage level received at its input voltage node. In an embodiment, the enhanced charge pump 202 can be a 2-phase cross-coupled switched-capacitor charge pump. As more fully disclosed herein, the enhanced charge pump 202 can employ DGBCs and AGBCs that can enable the enhanced charge pump 202 to operate with improved driving performance, as compared to conventional 2-phase cross-coupled switched-capacitor charge pumps.

In one aspect, the enhanced charge pump 202, which can be one unit cell (e.g., one 2-phase cross-coupled switched capacitor charge pump), or the enhanced charge pump 202 can be part of an enhanced multi-stage charge pump comprising n stages, wherein there can be an enhanced charge pump (e.g., 202) in each stage, and wherein n can be virtually any desired integer number. The enhanced charge pump 202 (e.g., at stage k) can include a specified number of CTSs (e.g., power switches), comprising CTS 204, CTS 206, CTS 208, and CTS 210. In an embodiment, the CTS 204, CTS 206, CTS 208, and CTS 210 each can be PMOS transistors. Note that, in comparison to the conventional charge pump, the system 200 can utilize PMOS CTSs 204 and 208 in place of the NMOS CTSs, which are typically used in conventional charge pumps.

The CTS 204 and CTS 208 each can be connected to an input voltage node $V_{in,k}$ and can receive a voltage (e.g., voltage signal) from a standard voltage source, if the enhanced charge pump 202 is the only charge pump or is the first stage of a plurality of charge pumps in an enhanced multi-stage charge pump; or, if the enhanced charge pump 202 is part of an enhanced multi-stage charge pump but is not the first stage, the input voltage node $V_{in,k}$ can receive the voltage (e.g., power signal) from a power output node $V_{out,k-1}$ of an enhanced charge pump from the previous stage. The CTS 204 (e.g., drain of the CTS 204) also can be connected to a node $a_k$ associated with circuit path a of the enhanced charge pump 202, the CTS 208 (e.g., drain of the CTS 208) also can be connected to a node $b_k$ associated with circuit path b of the enhanced charge pump 202.

The CTS 206 (e.g., source of the CTS 206) can be connected to the node $a_k$, the CTS 210 (e.g., source of the CTS 210) also can be connected to a node $b_k$. The CTS 206 and CTS 210 also can be connected to a output voltage node $V_{out,k}$, wherein the enhanced charge pump 202 can provide a desired output voltage to an electronic device or component and/or can provide the desired output voltage to a next stage (e.g., k+1 stage) of an enhanced multi-stage charge pump. The voltage produced at the output voltage node $V_{out,k}$ typically can be, or can approximately be, twice the voltage level of the voltage received at the input voltage node $V_{in,k}$. In another aspect, the CTS 206 (e.g., gate of the CTS 206) can be connected to the node $b'_k$ associated with the other circuit path, circuit path b, wherein switching of the CTS 206 between on and off states can be controlled based at least in part on the voltage level at the node $b'_k$, which can be applied to the gate of the CTS 206. In still another aspect, the CTS 210 (e.g., gate of the CTS 210) can be connected to the node $a'_k$ associated with the other circuit path, circuit path a, wherein switching of the CTS 210 between on and off states can be controlled based at least in part on the voltage level at the node $a'_k$, which can be applied to the gate of the CTS 210.

In yet another aspect, the enhanced charge pump 202 can comprise a DGBC 212 that can be employed to facilitate providing a desired gate voltage, which can be a desirably high boosted gate voltage, to the respective gates of the CTS 204 and CTS 208 at respective times to facilitate controlling switching of the respective CTSs 204 and 208 between on states and off states, respectively. The DGBC 212 can comprise a DGBC-a 214 that can be connected to the CTS 204

(e.g., connected to the gate of the CTS 204) and can be part of circuit path a. The DGBC-a 214 can be employed to facilitate providing a desired gate voltage, which can be a desirably high boosted gate voltage, to the gate of the CTS 204 at specified times to facilitate controlling switching of the CTS 204 between an on state and off state. The DGBC 212 also can comprise a DGBC-b 216 that can be connected to the CTS 208 (e.g., connected to the gate of the CTS 208) and can be part of circuit path b. The DGBC-b 216 can be employed to facilitate providing a desired gate voltage, which can be a desirably high boosted gate voltage, to the gate of the CTS 208 at other specified times (e.g., time periods opposite in phase to the specified times associated with the CTS 204) to facilitate controlling switching of the CTS 208 between an on state and off state In an aspect, the DGBC-a 214 can be connected to an input node $IN_{a,k}$, wherein the DGBC-a 214 can receive a voltage signal via the input node $IN_{a,k}$ to facilitate operation of the DGBC-a 214 and associated CTS 204. The voltage signal at the input node $IN_{a,k}$ can be received from a second clock signal (e.g., nclk) when the enhanced charge pump 202 is the only charge pump or is the first enhanced charge pump in an enhanced multi-state charge pump; or, if the enhanced charge pump 202 is part of an enhanced multi-state charge pump and is not the first stage, the voltage signal at the input node $IN_{a,k}$ can be received from a node $a'_k$ of an enhanced charge pump from the previous stage of the enhanced multi-state charge pump. In another aspect, the DGBC-a 214 can be connected to the node $a_k$ within the enhanced charge pump 202. In still another aspect, during specified periods, the DGBC-a 214 can operate to generate and/or transfer a desirably high gate boost voltage to the gate of the CTS 204 to facilitate controlling switching of the CTS 104 between on and off states. The DGBC-a 214, in part by providing a desirably high gate boost voltage to the CTS 204, can enhance or improve the overdrive voltage of the CTS 204, as compared to the overdrive voltage of a power switch in a conventional charge pump.

In accordance with other aspects, the DGBC-b 216 can be connected to an input node $IN_{b,k}$, wherein the DGBC-b 216 can receive a voltage signal via the input node $IN_{b,k}$ to facilitate operation of the DGBC-b 216 and associated CTS 208. The voltage signal at the input node $IN_{b,k}$ can be received from a first clock signal (e.g., clk) when the enhanced charge pump 202 is the only charge pump or is the first enhanced charge pump in an enhanced multi-state charge pump; or, if the enhanced charge pump 202 is part of an enhanced multi-state charge pump and is not the first stage, the voltage signal at the input node $IN_{b,k}$ can be received from a node $b'_k$ of an enhanced charge pump from the previous stage of the enhanced multi-state charge pump. In another aspect, the DGBC-b 216 can be connected to the node $b_k$ within the enhanced charge pump 202. In still another aspect, during specified periods, the DGBC-b 216 can operate to generate and/or transfer a desirably high gate boost voltage to the gate of the CTS 208 to facilitate controlling switching of the CTS 208 between on and off states. The DGBC-b 216, in part by providing a desirably high gate boost voltage to the CTS 208, can enhance or improve the overdrive voltage of the CTS 208, as compared to the overdrive voltage of a power switch in a conventional charge pump. The DGBC 212, including DGBC-a 214 and DGBC-b 216, can be the same or similar to, or can comprise the same or similar functionality as, respective DGBCs, as more fully described herein.

In yet another aspect, the enhanced charge pump 202 can comprise capacitor 218 (e.g., fly capacitor) and capacitor 220 (e.g., fly capacitor), which can be employed to facilitate producing a higher voltage at the output voltage node of the enhanced charge pump 202 than the voltage received at the input voltage node. A first terminal of the capacitor 218 can be connected to node $a_k$, and a second terminal of the capacitor 218 can be connected to the first clock node (clk node). A first terminal of the capacitor 220 can be connected to node $b_k$, and a second terminal of the capacitor 220 can be connected to the second clock node (nclk node).

The first clock signal (e.g., clk) can be opposite in phase in relation to the second clock signal (e.g., nclk). The total clock period can include a first clock period $\Phi_1$ and a second clock period $\Phi_2$. During clock period $\Phi_1$, clk=$V_{DD}$ and nclk=0V. The clock signals in clock period $\Phi_2$ are given by clk=0V and nclk=$V_{DD}$.

In accordance with various aspects, the enhanced charge pump 202 can contain an AGBC 222 that can be employed to facilitate further improving the performance of the enhanced charge pump 202. The AGBC 222 can comprise AGBC-a 224 and AGBC-b 226. In an aspect, the AGBC-a 224 can be connected to the first clock node (e.g., clk node) and can receive the first clock signal (e.g., clk signal) via the first clock node, can be connected to the input voltage $V_{in,k}$, and can be connected to the node $a_k$. The AGBC-a 224 also can comprise or be associated with the node $a'_k$. In another aspect, the AGBC-b 226 can be connected to the second clock node (e.g., nclk node) and can receive the second clock signal (e.g., nclk signal) via the second clock node, can be connected to the input voltage $V_{in,k}$, and can be connected to the node $b_k$. The AGBC-b 226 also can comprise or be associated with the node $b'_k$.

In an aspect, the AGBC-a 224 and AGBC-b 226 can be employed to enable the overdrive voltages of the CTSs 206 and 210, respectively, to facilitate enabling the CTSs 206 and 210 to operate desirably (e.g., optimally) independent, or at least substantially independent, of the loading current associated with the enhanced charge pump 202. With regard to circuit path a, the AGBC-a 224 can comprise or be associated with the node $a'_k$, and the AGBC-a 224 and/or the node $a'_k$ can keep track of the falling voltage at the node $a_k$ during the pumping phase of the capacitor 218, when clk=$V_{DD}$ during the time period $\Phi_1$. When the capacitor 218 is in the process of switching from the pumping phase to the charging phase, the voltage at node $a_k$ can drop down to $Vp_{a,k}$. During the charging phase, when clk=0 volts during the time period $\Phi_2$, the voltage level at node $a'_k$ can be equal to $Vp_{a,k}-V_{DD}$. The AGBC-a 224 can operate to enable the voltage level at node $a'_k$ to remain constant during the entire charging phase of the capacitor 218, as the node $a'_k$ can be isolated from the node $a_k$, while the voltage level at node $a'_k$ can rise by $\Delta V$ during this time period. The AGBC-a 224 can operate to provide or transfer the voltage at the node $a'_k$ to the gate of the CTS 210, wherein the voltage at the node $a'_k$ can be utilized to control the gate of the CTS 210 in circuit path b, to control switching of the CTS 210 between on and off states at desired time periods, wherein the capacitor 220 in circuit path b can be in the pumping phase when the capacitor 218 is in the charging phase. As a result, during the pumping phase of the capacitor 220, the AGBC-a 224 can facilitate switching the CTS 210 on with a source-to-gate voltage equal to $Vp_{b,k}-(Vp_{a,k}-V_{DD})$, which can ensure a desired overdrive voltage of $V_{DD}-V_{th}$, even when the loading current associated with the enhanced charge pump 202 is large (e.g., at or over 80 μA).

During the charging phase of the capacitor 218, the AGBC-a 224 can operate to apply a high voltage signal to the gate of the CTS 210 to switch off the CTS 210, as the AGBC-a 224 can produce and provide a high voltage signal that can be as high as $V_{out,k}$ during this time period. As a result, the AGBC-a 224 is able to operate to effectively shut down the CTS 210 during this time period to prevent any reverse current. In still another aspect, the AGBC-a 224 can be configured to ramp up the output voltage during the initial operation of the enhanced charge pump 202 to facilitate desired performance of the enhanced charge pump 202.

In accordance with still other aspects, with regard to circuit path b, the AGBC-b 226 can comprise or be associated with the node $b'_k$, and AGBC-b 226 and/or the node $b'_k$ can keep track of the falling voltage at the node $b_k$ during the pumping phase of the capacitor 220, when nclk=$V_{DD}$ during the time period $\Phi_2$. When the capacitor 220 is in the process of switching from the pumping phase to the charging phase, the voltage at node $b_k$ can drop down to $Vp_{b,k}$. During the charging phase, when nclk=0 volts during the time period $\Phi_1$, the voltage level at node $b'_k$ can be equal to $Vp_{b,k}-V_{DD}$. In an aspect, the AGBC-b 226 can operate to maintain the voltage level at node $b'_k$ constant during the entire charging phase of the capacitor 220, as the node $b'_k$ can be isolated from the node $b_k$, while the voltage level at node $b'_k$ can rise by $\Delta V$ during this time period. The AGBC-b 226 can provide or transfer the voltage at the node $b'_k$ to the gate of the gate of the CTS to facilitate controlling switching of the CTS 206 between an on and off state at other desired time periods (e.g., at time periods opposite in phase to the time periods wherein the voltage at node $a'_k$ is applied to the gate of the CTS 210) in circuit path a, wherein the capacitor 218 in circuit path a can be in the pumping phase when the capacitor 220 is in the charging phase. As a result, during the pumping phase of the capacitor 218, the AGBC-b 226 can operate to switch the CTS 206 on with the CTS 206 having a source-to-gate voltage equal to $Vp_{a,k}-(Vp_{b,k}-V_{DD})$, which can ensure a desired overdrive voltage of $V_{DD}-V_{th}$, even when the loading current associated with the enhanced charge pump 202 is large (e.g., at or over 80 µA).

In another aspect, during the charging phase of the capacitor 218, the AGBC-b 226 can operate to apply a high voltage signal to the gate of the CTS 206 to switch off the CTS 206, as the AGBC-b 226 can produce and provide a high voltage signal that can be as high as $V_{out,k}$ during this time period. As a result, the AGBC-b 226 is able to operate to effectively shut down the CTS 206 during this time period to prevent any reverse current. In still another aspect, the AGBC-b 226 can be configured to ramp up the output voltage during the initial operation of the enhanced charge pump 202 to facilitate desired performance of the enhanced charge pump 202.

Figure 3:
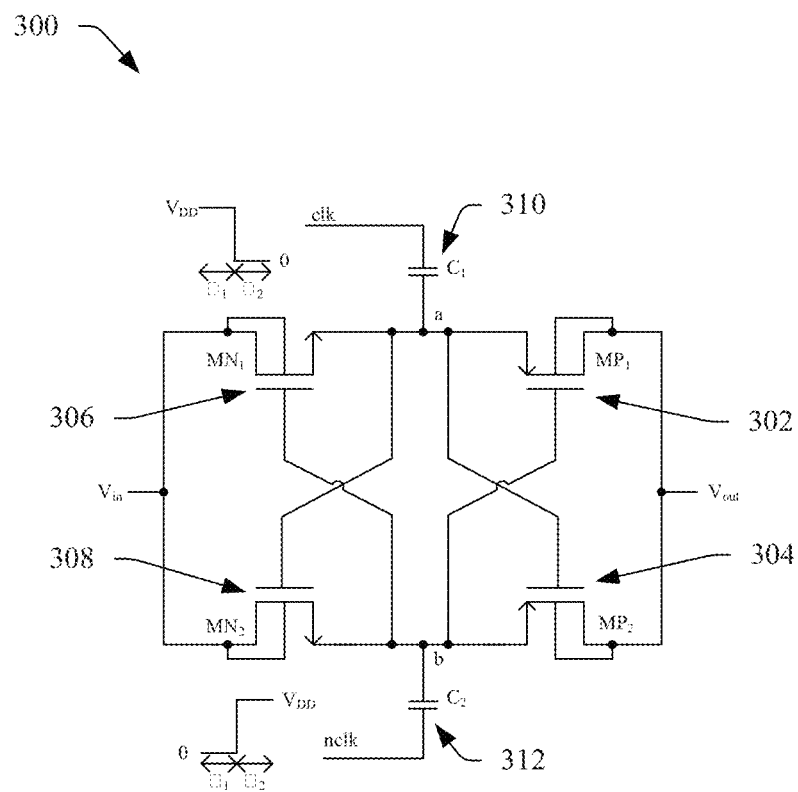
FIG. 3 illustrates a diagram of a traditional 2-phase cross-coupled switched-capacitor charge pump.

By way of comparison to the enhanced charge pump, as disclosed herein, turning briefly to FIG. 3, illustrated is a diagram of a traditional 2-phase cross-coupled switched-capacitor charge pump 300. Charge pump 300 is driven by complementary clock signals clk and nclk. The charge pump 300 can comprise CTSs $MP_1$ 302, $MP_2$ 304, $MN_1$ 306, and $MN_2$ 308, which can be power switches used to generate a higher voltage (e.g., approximately $2V_{DD}$ for a first stage charge pump) at the output of the charge pump 300 based on a lower input voltage $V_{in}$ (e.g., $V_{DD}$ for a first stage charge pump). In the traditional charge pump 300, $MP_1$ 302 and $MP_2$ 304 each can be PMOS transistors, and $MN_1$ 306, and $MN_2$ 308 each can be NMOS transistors. The charge pump 300 also can include flying capacitor $C_1$ 310, which can be connected to the clk signal and node a, and flying capacitor $C_2$ 312, which can be connected to the nclk signal and node b.

During clock period $\Phi_1$, clk=$V_{DD}$ and nclk=0V. During time period the CTSs $MP_1$ 302 and $MN_2$ 308 are both switched to or maintained in an on state in response to the clk signal being applied to their respective gates, while $MN_1$ 306 and $MP_2$ 304 are both switched to or maintained in an off state in response to the nclk signal being applied to their respective gates. As a result, the flying capacitor $C_2$ 312 is charged by the input voltage $V_{in}$. Therefore, $C_2$ 312 is in the charging phase. While the flying capacitor $C_1$ 310 is in pumping phase. Assuming $C_1$ 310 is previously charged to have the same voltage as the input voltage $V_{in}$ (e.g., as a result of a previous clock cycle), theoretically a voltage $V_{DD}+V_{in}$ will appear at node a because the clk signal is coupled with the voltage $V_{in}$ stored in $C_1$ at node a. This high voltage can be passed to the node a through CTS $MP_1$ 302 which is $V_{OUT}$ of this unit stage charge pump 300.

The clock signals in clock period $\Phi_2$ are given by clk=0V and nclk=$V_{DD}$. During time period $\Phi_2$, the CTS $MP_1$ 302 and $MN_2$ 308 are both switched off state in response to the clk signal being applied to their respective gates, while $MN_1$ 306 and $MP_2$ 304 are both switched on in response to the nclk signal being applied to their respective gates. Therefore, the flying capacitor $C_1$ 310 is charged by the input voltage $V_{in}$, and $C_1$ 310 is in the charging phase. While the flying capacitor $C_2$ 312 is in pumping phase. Similar to the clock period $\Phi_1$, during clock period $\Phi_2$, a high voltage $V_{DD}+V_{in}$ will appear at node b, while the voltage at node a can be equal to the input voltage $V_{in}$. The high voltage at node b can be passed to the output node through CTS $MP_2$ 304, which is switched to an on state during this time. As a result, a high voltage $V_{DD}+V_{in}$ can be output from the charge pump 300 at $V_{OUT}$ during both clock periods $\Phi_1$ and $\Phi_2$.

Figure 4:
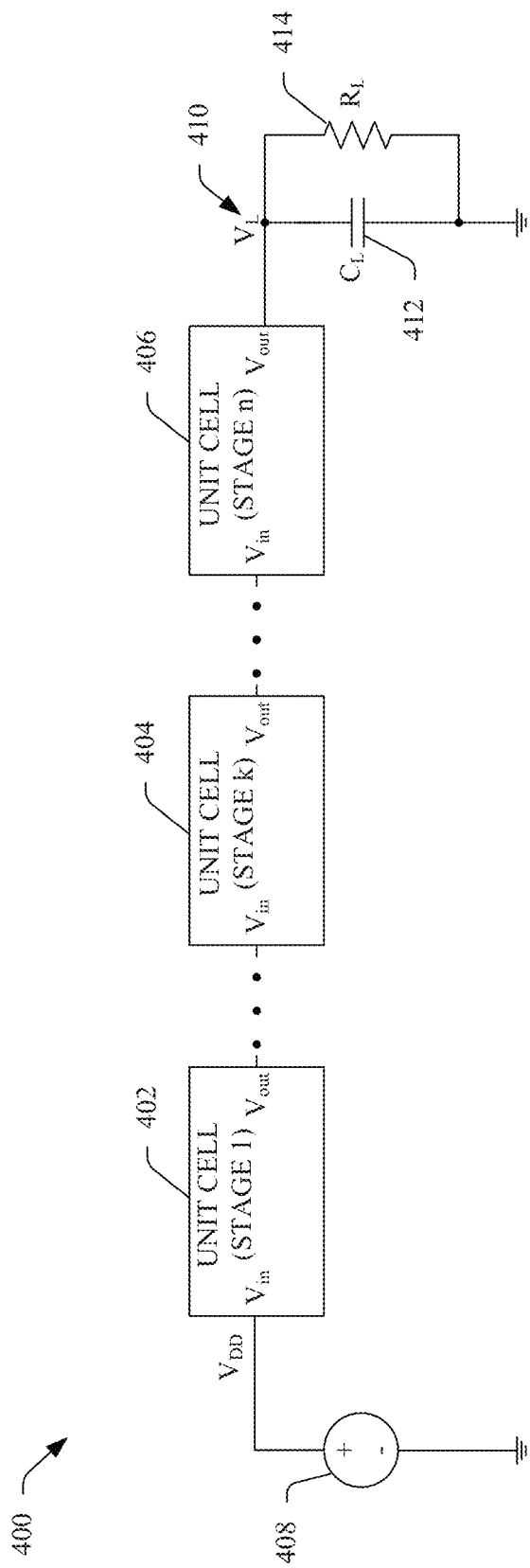
FIG. 4 depicts a diagram of a system employing multiple traditional 2-phase cross-coupled switched-capacitor charge pumps to generate a higher voltage at an output based on a lower input voltage.

Referring to FIG. 4 (along with FIG. 3), depicted is a diagram of a system 400 employing multiple traditional 2-phase cross-coupled switched-capacitor charge pumps to generate a higher voltage at an output based on a lower input voltage. To achieve a higher output voltage, the system 400 can include multiple unit cells (e.g., n unit cells, wherein n is a desired integer number), such as unit cell 402 at Stage 1, unit cell 404 for Stage k, and unit cell 406 for Stage n, wherein each of the unit cells can be traditional 2-phase cross-coupled switched-capacitor charge pumps. The unit cells can be cascaded as shown in FIG. 4, wherein unit cell 402 can receive an input voltage $V_{DD}$ from voltage source 408 at the input $V_{in,1}$ of the unit cell 402, and can provide its output voltage $V_{OUT,1}$ to the input (e.g., $V_{in,k}$) of the unit cell of the input of the next stage, Stage 2, wherein, if the system 400 includes 3 stages (e.g., n=3), unit cell 404 can be Stage 2 with k=2, and unit cell 406 can be Stage 3 with n=3, and unit cell 404 can provide its output voltage $V_{OUT,2}$ to the input $V_{in,n}$ of Stage 3, unit cell 406.

$V_L$ 410, $C_L$ 412, and $R_L$ 414 are the output voltage, output capacitor and output load of the multi-stage cross-coupled switched-capacitor charge pump, respectively, wherein $V_L$ is the voltage output from the unit cell 406, which is the last stage, Stage n, of the system 400. As a result, $V_{in,k}$ in the k-th stage equals to $V_{OUT}$ of the (k−1)-th stage. Therefore, theoretically a cross coupled charge pump with n stages cascaded can achieve an output voltage equal to $(n+1)V_{DD}$. However, the driving power of this charge pump is determined by the equivalent series resistance observed at the output node of the charge pump, which is also known as the output resistance $R_{out}$ of the charge pump. Due to the voltage drop across $R_{out}$, the actual output voltage observed at the output of the charge pump is given by $$V_L=(n+1)V_{DD}-I_L R_{out},\qquad\text{(Eq. 1)}$$

where $I_L$ is the output loading current or driving current of the charge pump, and $I_L R_{out}$ is known as the output voltage drop. Note that the output voltage drops linearly proportional to the output resistance of the switched capacitor charge pump. Therefore, a small output voltage drop can be designed by reducing $R_{out}$, since the output resistance of a switched-capacitor charge pump is inversely proportional to the switching frequency of the switched-capacitor charge pump, the flying capacitors (e.g., 310, 312), the on-resistance of the CTS transistors (e.g., 302, 304, 306, and 308), and the overdrive voltage $V_O$ for the CTS of the last stage of the cascaded switched-capacitor charge pump. As a result, $R_{out}$ can be effectively reduced by increasing these parameters. However, increasing the switching frequency to reduce $R_{out}$ will increase the switching loss, and thus reduce the efficiency of the switched-capacitor charge pump. Increasing the capacitance flying capacitors (e.g., 310, 312) and reducing the on-resistance of the CTS transistors (e.g., 302, 304, 306, and 308) also can reduce $R_{out}$, however, this will increase the silicon area required to implement the capacitors and CTS transistors. Moreover, this will also increase the complexity and silicon area of the associated accessory circuits of the charge pump for driving the increased capacitances of the flying capacitors and the gate capacitances of the CTS transistors with low on-resistance. Finally, the gate voltages of the CTS transistors in the conventional cross-coupled switched-capacitor charge pump are obtained from the node voltages at the flying capacitors directly. As a result, the overdrive voltages of the CTS transistors will decrease with an increasing loading current. The decreased overdrive voltage will therefore cause an increase in the on-resistance of the CTS transistors and thus increase the output voltage drop of the charge pump. In other words, attempting to improve the output resistance using these conventional techniques (e.g., increasing switching frequency; increasing capacitance of flying capacitors and reducing on-resistance of CTS transistors) will inevitability cost a large increase in the silicon area required to implement the charge pump.

Figure 5:
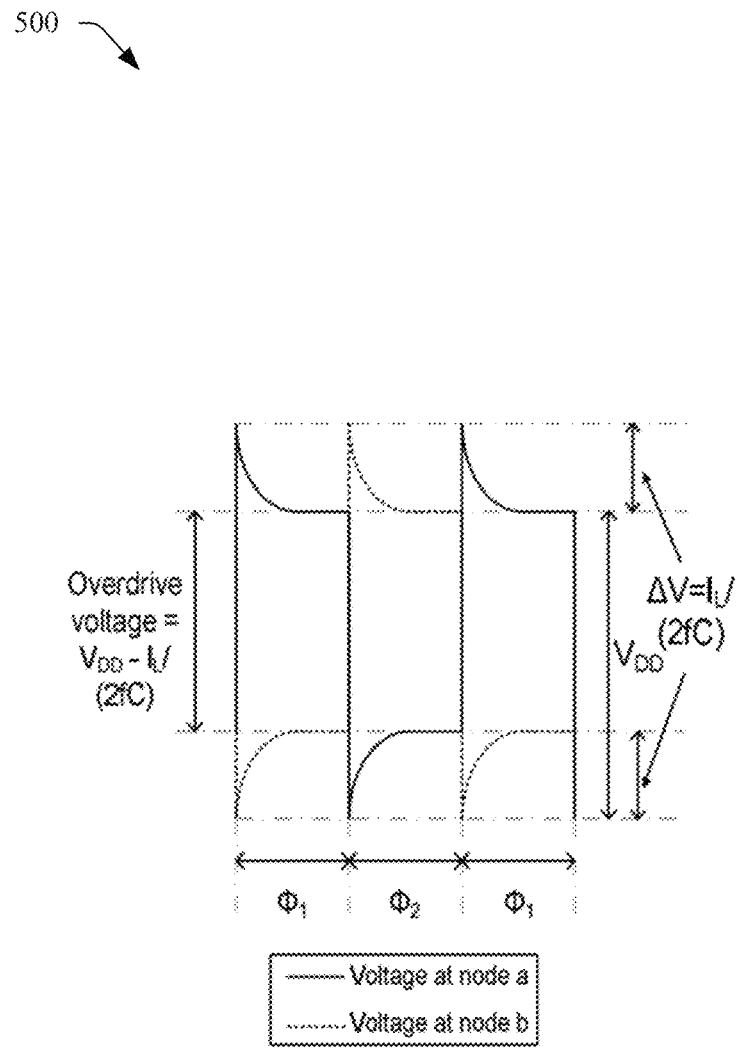
FIG. 5 illustrates a diagram of an example graph showing the overdrive voltage for a traditional cross-coupled switched-capacitor charge pump during clock periods $\Phi_1$ and $\Phi_2$.

Referring briefly to FIG. 5 (along with FIGS. 3 and 4), illustrated is an example graph 500 showing the overdrive voltage for a traditional cross-coupled switched-capacitor charge pump 300 during clock periods $\Phi_1$ and $\Phi_2$. The voltage at Node a is shown with a solid line, and the voltage at Node b is shown with the dotted line, as more fully shown and described in FIG. 5. As shown in graph 500, the overdrive voltage can be equal to $V_{DD}-I_L/(2fC)$, wherein the $\Delta V=I_L/(2fC)$, where $I_L$ can be the loading current, f can be the switching frequency, and C can be the capacitance of the flying capacitor (e.g., 310, 312).

As more fully disclosed herein, the disclosed subject matter can overcome the drawbacks of the conventional cross-coupled switched-capacitor charge pump, and can provide for an increased overdrive voltage, thereby improving the output resistance, and hence improving charge pump efficiency under widely varying (e.g., including large) loading current conditions (e.g., including loading current conditions with loading current at or greater than 100 microamps (µA)).

Figure 6:
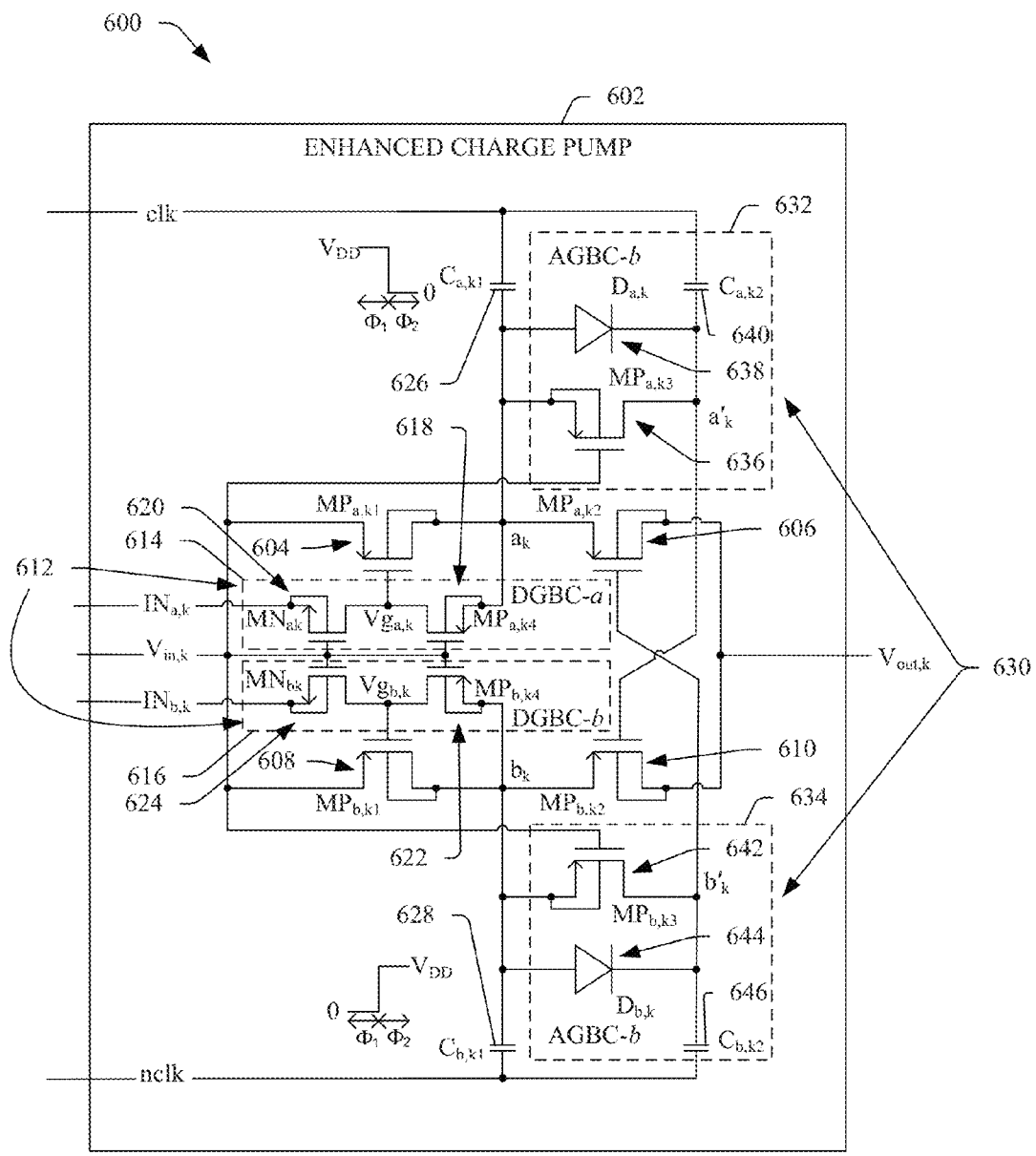
FIG. 6 depicts a circuit diagram of an example system that can employ DGBCs and AGBCs in an enhanced charge pump in accordance with various aspects and embodiments of the disclosed subject matter.

FIG. 6 illustrates a circuit diagram of an example system 600 that can employ DGBCs and AGBCs in an enhanced charge pump (e.g., an enhanced 2-phase cross-coupled switched-capacitor charge pump) in accordance with various aspects and embodiments of the disclosed subject matter. The system 600 can comprise an enhanced charge pump 602, wherein the enhanced charge pump 602 can be or can comprise a 2-phase cross-coupled switched-capacitor charge pump that can operate with improved driving performance, as compared to conventional 2-phase cross-coupled switched-capacitor charge pumps.

Referring again briefly to FIGS. 3 and 5 (along with FIG. 6), to illustrate, consider the node voltages of the unit cell in FIG. 3, which is plotted in graph 500 of FIG. 5. Observed from the graph 500, the node voltages of the flying capacitors (e.g., 310, 312) at both Nodes a and b are not constant. These two node voltages fluctuate between the charging and discharging phases of the flying capacitors. During $\Phi_1$, both $MP_1$ 302 and $MN_2$ 308 are being turned on and the source-to-gate voltage of $MP_1$ 302 and the gate-to-source voltages of $MN_2$ 308 are equal to the voltage difference between Node a and Node b, which is substantially close to being equal to $V_{DD}-\Delta V$, with $\Delta V=I_L/(2fC)$. Hence, the overdrive voltage of the CTS transistors (e.g., 302, 304, 306, 308) in the cross-coupled switched-capacitor charge pump is given by $$V_o = V_{DD} - \frac{I_L}{2fC} - V_{th}, \quad (\text{Eq. 2})$$

where $V_o$ is the overdrive voltage and $V_{th}$ is the threshold voltage of a CTS transistor, $V_{DD}$ is the input voltage (e.g., for a charge pump in the first stage), $I_L$ is the loading current, f is the switching frequency, and C is the capacitance of the flying capacitor (e.g., 310, 312). As can be observed from Equation (2), the overdrive voltage $V_o$ of the CTS transistors decreases with an increasing loading current $I_L$.

The disclosed subject matter can employ DGBCs with a multi-phase charge pump (e.g., 2-phase cross-coupled switched capacitor charge pump) to maintain, or at least substantially maintain, the overdrive voltages of all of the CTS transistors in the charge pump so that the overdrive voltages remain unchanged, or at least remain substantially unchanged, under widely varying loading current conditions, including large loading current conditions (e.g., loading current of 60 µA, 80 µA, 100 µA or more) and can thereby improve the current driving capability of the charge pump, as compared to conventional charge pump schemes, in accordance with the various aspects and embodiments as more fully disclosed herein.

In one aspect, the enhanced charge pump 602, which can comprise or can be one unit cell (e.g., one 2-phase cross-coupled switched capacitor charge pump) of Stage k, can include a specified number of CTSs (e.g., power switches), comprising CTS 604 (also referred to as $MP_{a,k1}$ 604), CTS 606 (also referred to as $MP_{a,k2}$ 606), CTS 608 (also referred to as $MP_{b,k1}$ 608), and CTS 610 (also referred to as $MP_{b,k2}$ 610). In an embodiment, the CTS 604, CTS 606, CTS 608, and CTS 610 each can be PMOS transistors. Note that, in comparison to the conventional charge pump, the system 600 utilizes PMOS CTSs 604 and 608 in place of NMOS CTSs (e.g., NMOS CTSs 306 and 308 of FIG. 3), wherein the PMOS CTSs 604 and 608 can be driven by an AGBC, as more fully disclosed herein, such that the overdrive voltages of the two PMOS CTSs 604 and 608 can be independent of the loading current.

In accordance with various aspects, the enhanced charge pump 602 can comprise a DGBC 612 that can be employed to produce, transfer and/or apply a desired gate boost voltage $Vg_{a,k}$ to the gate of the CTS 604 and a desired gate boost voltage $Vg_{b,k}$ to the gate of the CTS 608 at respective desired times. The DGBC 612 can comprise a DGBC-a 614 and a DGBC-b 616, wherein the DGBC-a 614 can be part of circuit path a, and DGBC-b 616 can be part of circuit path b. The DGBC-a 614 can comprise a switch 618 and switch 620, wherein the switch 618 and switch 620 respectively can be controlled to switch between an off state and an on state, in response to a clk signal or voltage signal received at the node $IN_{a,k}$, to facilitate producing and/or applying a desired gate boost voltage $Vg_{a,k}$ to the gate of the CTS 604 to facilitate controlling switching of the CTS 604 between an off state and an on state, wherein the source of the CTS 604 can be connected to $IN_{a,k}$, and the drain of the CTS 604 can be connected to node $a_k$. The DGBC-a 614 can enhance or improve the overdrive voltage of the CTS 604, as compared to the overdrive voltage of a power switch in a conventional charge pump. In an embodiment, the switch 618 (also referred to as $MP_{a,k4}$ 618) can be a PMOS transistor, and the switch 620 (also referred to as $MN_{a,k}$ 620) can be an NMOS transistor.

Similarly, with regard to circuit path b, the DGBC-b 616 can comprise a switch 622 and switch 624, wherein the switch 622 and switch 624 respectively can be controlled to switch between an off state and an on state, in response to an nclk signal or voltage signal received at $IN_{b,k}$, to facilitate producing and/or applying a desired gate boost voltage $Vg_{b,k}$ to the gate of the CTS 608 ($MP_{b,k1}$) to facilitate controlling switching of the CTS 608 between an off state and an on state, wherein the source of the CTS 608 can be connected to the node $IN_{b,k}$, and the drain of the CTS 608 can be connected to node $b_k$. The DGBC-b 616 can enhance or improve the overdrive voltage of the CTS 608, as compared to the overdrive voltage of a power switch in a conventional charge pump. In an embodiment, the switch 622 (also referred to as $MP_{b,k4}$ 622) can be a PMOS transistor, and the switch 624 (also referred to as $MN_{b,k}$ 624) can be an NMOS transistor.

In another aspect, in circuit path a, the enhanced charge pump 602 can include a capacitor 626 (also referred to as $C_{a,k1}$ 626 or flying capacitor 626), which can be connected to the clk and node $a_k$. In circuit path b, the enhanced charge pump 602 can include a capacitor 628 (also referred to as $C_{b,k1}$ 628 or flying capacitor 628), which can be connected to the nclk and node $b_k$.

In circuit path a of the k-th stage, during the charging phase of capacitor 626 ($C_{a,k1}$), the switch 620 ($MN_{a,k}$) of the DGBC-a 614 is being turned on while the switch 618 ($MP_{a,k4}$) of the DGBC-a 614 is being switched off or shut down. As the result, the low voltage at node $IN_{a,k}$, which can be connected to the node $a'_{k-1}$ in the previous stage (or connected to clk if the k-th stage is the first stage), will be passed to the gate of the CTS 604 ($MP_{a,k1}$), wherein $Vg_{ak}=IN_{a,k}$. This low voltage obtained from circuit path a in the previous stage (e.g., k-1 stage) (or obtained from the nclk signal when the k-th stage is the first stage) will maintain constant during the charging phase of the capacitor $C_{a,(k-1)1}$ (flying capacitor of the previous stage) and can be equal to ($Vp_{a,k-1}-V_{DD}$). Note that the voltage at the input of the k-th stage, the voltage $V_{in,k}$, can be maintained at or substantially close to the voltage $Vp_{a,k-1}$ throughout the whole clock cycle. This is because the voltages at node $a_{k-1}$ and node $b_{k-1}$ of the previous stage are being passed to the output, $V_{out,k-1}$, at alternate clock phases of this 2-phase cross coupled charge pump. As a result, the source-to-gate voltages of the CTS 604 ($MP_{a,k1}$), as well as CTS 608 ($MP_{b,k1}$), can be equal to $V_{DD}$ and can be maintained constant or substantially close to constant under various loading current conditions. During the pumping phase of the capacitor 626 ($C_{a,k1}$), the switch 620 ($MN_{a,k}$) of the DGBC-a 614 is being switched off (e.g., turned off, or shut down) while the switch 618 ($MP_{a,k4}$) of the DGBC-a 614 is being switched on. Therefore, the DGBC-a 614 can transfer, provide, or apply the high voltage at node $a_k$ to the gate of the CTS 604 ($MP_{a,k1}$), and, as a result, the gate voltage $Vg_{a,k}$ can be equal to the voltage at node $a_k$, which can switch off (e.g., shut down) the CTS 604 completely.

Circuit path b can be a mirror duplicate of circuit path a. As a result, the operation of the circuit in circuit path b can be the same or similar to that as described with regard to circuit path a. In circuit path b of the k-th stage, during the charging phase of capacitor 628 ($C_{b,k1}$), the switch 624 ($MN_{b,k}$) of the DGBC-b 616 can be switched on while the switch 622 ($MP_{b,k4}$) of the DGBC-b 616 can be switched off (e.g., shut down). As the result, the DGBC-b 616 can transfer a low voltage at node $IN_{b,k}$, which can be connected to the node $b'_{k-1}$ in the previous stage (or connected to nclk if the k-th stage is the first stage), to the gate of the CTS 608 ($MP_{b,k1}$), wherein the gate voltage $Vg_{bk}=IN_{b,k}$. This low voltage obtained from circuit path b in the previous stage (or the nclk signal when the k-th stage is the first stage) can be maintained constant during the charging phase of the capacitor $C_{b,(k-1)1}$ (flying capacitor of circuit path b in the previous stage) and can be equal to ($Vp_{b,k-1}-V_{DD}$). Note again that the voltage at the input of the k-th stage, the voltage $V_{in,k}$, can be maintained at or substantially close to the voltage $Vp_{b,k-1}$ throughout the whole clock cycle. As a result, the source-to-gate voltages of the CTS 608 ($MP_{b,k1}$), as well as CTS 604 ($MP_{a,k1}$), can be equal to $V_{DD}$ and can be maintained constant or substantially close to constant under various and relatively wide loading current conditions. During the pumping phase of the capacitor 628 ($C_{b,k1}$), the switch 624 ($MN_{b,k}$) of the DGBC-b 616 is being switched off while the switch 622 ($MP_{b,k4}$) is being switched on. Therefore, the DGBC-b 616 can transfer, provide, or apply the high voltage at node $b_k$ to the gate of the CTS 608 ($MP_{b,k1}$), and, as a result, the gate voltage $Vg_{b,k}$ can be equal to the voltage at node $b_k$, which can switch off (e.g., shut down) the CTS 608 completely.

In accordance with various other aspects, the enhanced charge pump 602 can comprise an AGBC 630 that can be employed to facilitate controlling switching of the CTS 606 and CTS 610 to facilitate improved performance (e.g., improved overdrive voltages associated with the CTSs 606 and 610) of the enhanced charge pump 602. In an aspect, the AGBC 630 can include an AGBC-a 632 that can be associated with circuit path a, and an AGBC-b 634 that can be associated with circuit path b. The AGBC-a 632 can facilitate controlling operation of (e.g., driving, controlling switching of) the CTS 606, and the AGBC-b 634 can facilitate controlling operation of the CTS 610, among other functions the AGBC-a 632 and AGBC-b 634 have. The AGBC-a 632 can include a switch 636 (also referred to as $MP_{a,k3}$ 636), which can be a small PMOS transistor, a diode 638 (also referred to as $D_{a,k}$ 638), and a capacitor 640 (also referred to as $C_{a,k2}$ 640), which can be a relatively small capacitor. The switch 636 can be in parallel with the diode 638, and can be connected to node $a'_k$. The diode 638 can be connected to respective ends of capacitors 626 and 640. The AGBC-b 634 can include a switch 642 (also referred to as $MP_{b,k3}$ 642), which can be a small PMOS transistor, a diode 644 (also referred to as $D_{b,k}$ 644), and a capacitor 646 (also referred to as $C_{b,k2}$ 646), which can be a relatively small capacitor. The switch 642 can be in parallel with the diode 644, and can be connected to node $b'_k$. The diode 644 can be connected to respective ends of capacitor 628 and capacitor 646.

With regard to the AGBC-a 632 of circuit path a, with the switch 636 ($MP_{a,k3}$) being turned on, the node $a'_k$ can follow the voltage at node $a_k$ during the pumping phase of the flying capacitor 626 ($C_{a,k1}$). When the capacitor 626 ($C_{a,k1}$) switches to the charging phase at the falling edge of the clk signal, the switch 636 ($MP_{a,k3}$) can be switched off (e.g., shut down). When it is assumed the voltage at node a is dropped to $Vp_{a,k}$ just before the switch 636 ($MP_{a,k3}$) shuts down, a voltage equal to $Vp_{a,k}-V_{DD}$ can appear at node $a'_k$ during the charging phase of the capacitor 626 ($C_{a,k1}$). This AGBC-a 632 can operate to maintain the voltage at the node $a'_k$ constant during the whole charging phase of the capacitor 626 ($C_{a,k1}$) as the node $a'_k$ can be isolated from the node $a_k$, while the voltage at node $a_k$ can rise by the amount $\Delta V$, which can be the ripple voltage during this time period. In an aspect, the AGBC-a 632 can apply or transfer the voltage (e.g., constant voltage during the charging phase of the capacitor 626 ($C_{a,k1}$)) at node a'$_k$ to the gate of the CTS 610 (MP$_{b,k2}$) to control switching of the CTS 610 (MP$_{b,k2}$) in circuit path b, wherein, during this time, the capacitor 628 ($C_{b,k1}$) can be in the pumping phase and the capacitor 626 ($C_{a,k1}$) can be in the charging phase. As a result, the AGBC-a 632, using the voltage at node a'$_k$ to control the gate of the CTS 610 (MP$_{b,k2}$) in circuit path b, can switch the CTS 610 (MP$_{b,k2}$) on, wherein the CTS 610 (MP$_{b,k2}$) can have a source-to-gate voltage equal to Vp$_{b,k}$–(Vp$_{b,k}$–V$_{DD}$), which can ensure an overdrive voltage of magnitude equal to V$_{DD}$–V$_{th}$ under a variety of (e.g., widely varying) output current loading conditions for the CTS 610 (MP$_{b,k2}$).

The AGBC-b 634 for the circuit path b can operate similar to AGBC-a 632. With regard to the AGBC-b 634 of circuit path b, with the switch 642 (MP$_{b,k3}$) being switched on, the node b'$_k$ can follow the voltage at node b$_k$ during the pumping phase of the flying capacitor 628 ($C_{b,k1}$). When the capacitor 628 ($C_{b,k1}$) switches to the charging phase at the falling edge of the nclk signal, the switch 642 (MP$_{b,k3}$) can be switched off (e.g., shut down). When it is assumed the voltage at node a is dropped to Vp$_{b,k}$ just before the switch 642 (MP$_{b,k3}$) shuts down, a voltage equal to Vp$_{b,k}$–V$_{DD}$ can appear at node b'$_k$ during the charging phase of the capacitor 628 ($C_{b,k1}$). The AGBC-b 634 can operate to maintain the voltage at the node b'$_k$ constant during the whole charging phase of the capacitor 628 ($C_{b,k1}$) as the node b'$_k$ can be isolated from the node b$_k$, while the voltage at the node b$_k$ can rise by the amount ΔV, which can be the ripple voltage during this time period. In an aspect, the AGBC-b 634 can transfer or apply the voltage (e.g., constant voltage during the charging phase of the capacitor 628 ($C_{b,k1}$)) at the node b'$_k$ to the gate of the CTS 606 (MP$_{a,k2}$) in circuit path a to control switching of the CTS 606 (MP$_{a,k2}$), wherein, during this time, the capacitor 626 ($C_{a,k1}$) can be in the pumping phase and the capacitor 628 ($C_{b,k1}$) can be in the charging phase. As a result, AGBC-b 634, using the voltage at node b'$_k$ to control the gate of the CTS 606 (MP$_{a,k2}$), can switch the CTS 606 (MP$_{a,k2}$) to the on state, wherein the CTS 606 (MP$_{a,k2}$) can have a source-to-gate voltage equal to Vp$_{b,k}$–(Vp$_{b,k}$–V$_{DD}$), which can ensure an overdrive voltage of magnitude equal to V$_{DD}$-V$_{th}$ under a variety of (e.g., widely varying) output current loading conditions for the CTS 606 (MP$_{a,k2}$).

In an aspect, the AGBC-a 632 and AGBC-b 634, respectively, can provide a gate voltage as high as the V$_{out,k}$ to the gates of the CTS 610 (MP$_{b,k2}$) and CTS 606 (MP$_{a,k2}$) during the respective charging phases of capacitor 626 ($C_{a,k1}$) and capacitor 628 ($C_{b,k1}$). As a result, the AGBC-a 632 and AGBC-b 634, respectively, can facilitate controlling switching of the respective CTSs to completely shut down the CTS 610 (MP$_{b,k2}$) and CTS 606 (MP$_{a,k2}$) at desired time periods, respectively, and can thereby prevent or minimize any reverse current problem.

In another aspect, the diodes 638 and 644 in the AGBC-a 632 and AGBC-b 634, respectively, can provide a quick initialization of the AGBC-a 632 and AGBC-b 634, respectively. Such quick initialization of the AGBC-a 632 and AGBC-b 634 by the diodes 638 and 642 can facilitate improving the power efficiency of the AGBC-a 632 and AGBC-b 634 as well as the enhanced charge pump 602 as a whole.

In accordance with still another aspect, to facilitate ensuring the desired (e.g., correct, optimal) operation of the CTSs 604, 606, 608 and 610 (e.g., PMOS transistors) and to avoid body effect, the bodies of all of the CTSs 604, 606, 608 and 610 in the circuit of the enhanced charge pump 602 can be connected to their respective drain terminals. This connection can reduce the threshold voltages of the CTSs 604, 606, 608 and 610, which can allow the enhanced charge pump 602 (e.g., enhanced 2-phase cross-coupled switched-capacitor charge pump) to operate at low supply voltage conditions. The disclosed circuit of the enhanced charge pump 602 further has the advantage that, when the voltage at the drain node of a CTS (e.g., 604, 606, 608, 610) is lower than that of the source node of the CTS, the reverse biased p-n junction between the N-well and the substrate can stop current from flowing to the substrate. As a result, even if the voltage at the drain node of the CTS is much lower than that of the source node of the CTS, and the p-n junction between the source and the N-well is turned on, the current will only flow into the flying capacitors (e.g., 626, 628) of the enhanced charge pump 602, and thus will not affect the efficiency of the disclosed circuit of the enhanced charge pump 602.

Figure 7:
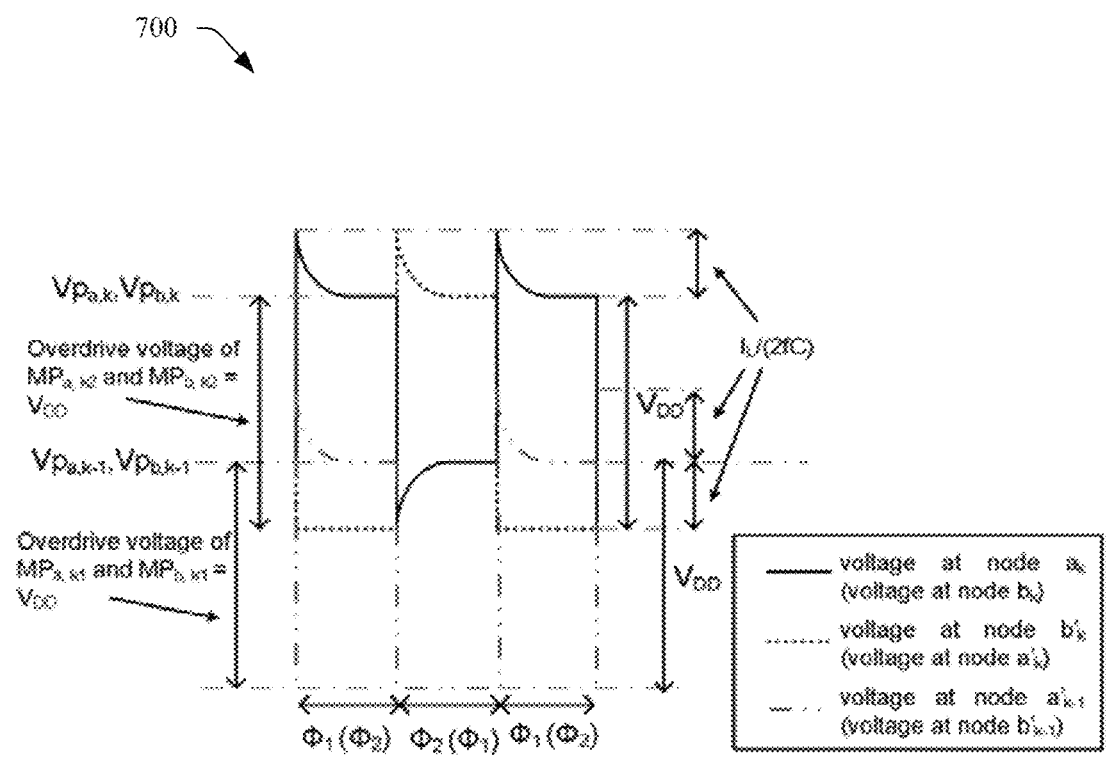
FIG. 7 illustrates an example graph that shows the overdrive voltage for the enhanced charge pump during clock periods $\Phi_1$ and $\Phi_2$.

FIG. 7 illustrates an example graph 700 showing the overdrive voltage for the enhanced charge pump 602 (e.g., the enhanced cross-coupled switched-capacitor charge pump) during clock periods $\Phi_1$ and $\Phi_2$. The graph 700 includes the voltage at node a$_k$ (and b$_k$), the voltage at node b'$_k$ (and a'$_k$), and the voltage at node a'$_{k-1}$ (and b'$_{k-1}$) over time. The graph 700 illustrates the overdrive voltages (e.g., equal to V$_{DD}$) of CTS 606 and CTS 610, and the overdrive voltages (e.g., equal to V$_{DD}$) of CTS 604 and CTS 608, respectively. The graph 700 also illustrates the Vp$_{a,k}$ and Vp$_{b,k}$, and Vp$_{a,k-1}$ and Vp$_{a,k-1}$.

Figure 8:
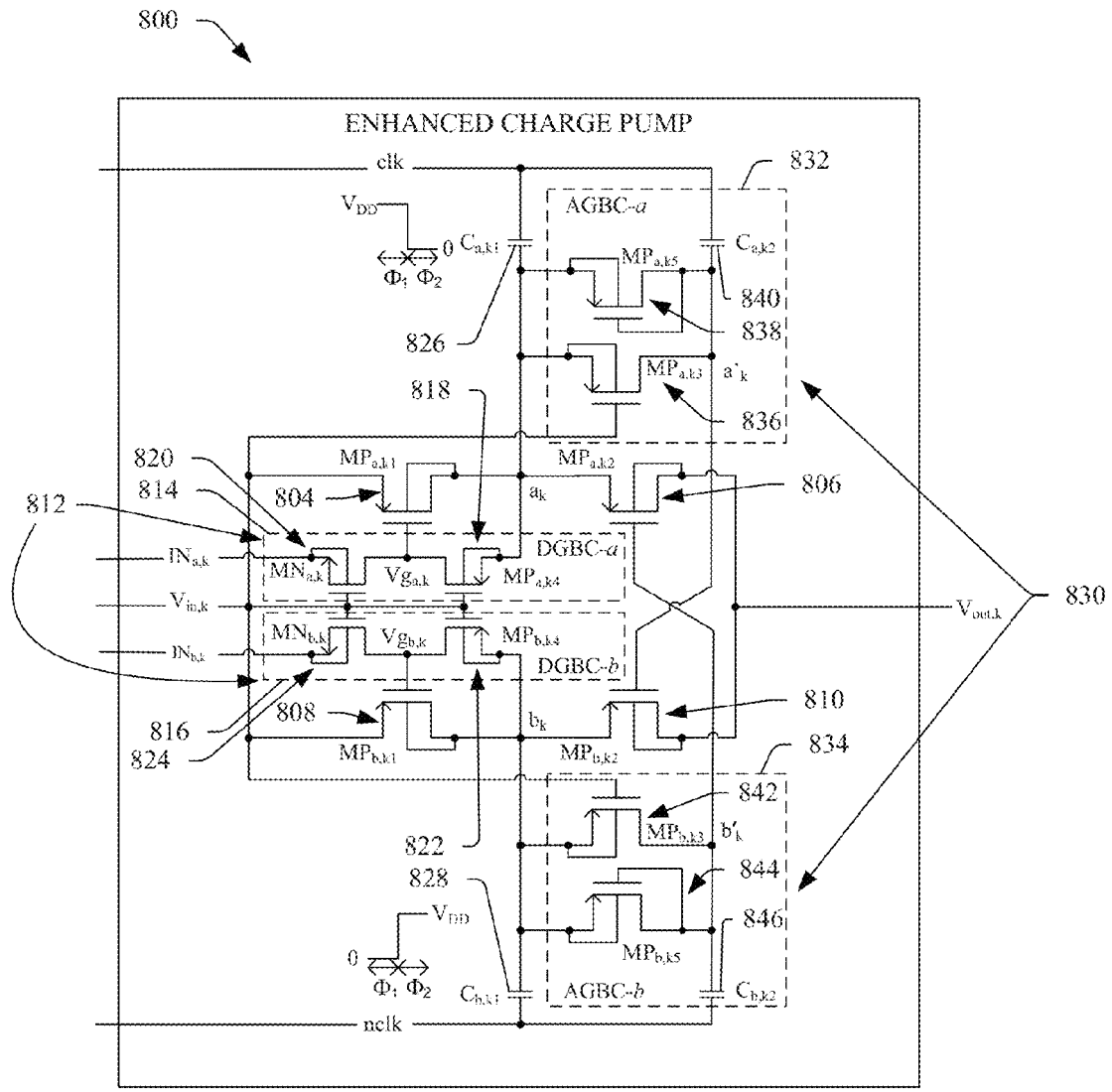
FIG. 8 depicts a circuit diagram of another example system that can employ DGBCs and AGBCs in an enhanced charge pump in accordance with various aspects and embodiments of the disclosed subject matter.

FIG. 8 depicts a circuit diagram of another example system 800 that can employ DGBCs and AGBCs in an enhanced charge pump in accordance with various aspects and embodiments of the disclosed subject matter. The system 800 can comprise an enhanced charge pump 802, wherein the enhanced charge pump 802 can be a 2-phase cross-coupled switched-capacitor charge pump that can operate with improved driving performance, as compared to conventional 2-phase cross-coupled switched-capacitor charge pumps. The charge pump 802 can employ DGBCs to maintain, or at least substantially maintain, the overdrive voltages of all of the CTS transistors in the charge pump 802 so that the overdrive voltages remain unchanged, or at least remain substantially unchanged, under widely varying loading current conditions. The system 800 can thereby improve the current driving capability of the charge pump 802, as compared to conventional charge pump schemes, in accordance with the various aspects and embodiments as more fully disclosed herein.

In one aspect, the enhanced charge pump 802, which can comprise or can be one unit cell (e.g., one 2-phase cross-coupled switched capacitor charge pump) of Stage k, can include a specified number of CTSs (e.g., power switches), comprising CTS 804 (also referred to as MP$_{a,k1}$ 804), CTS 606 (also referred to as MP$_{a,k2}$ 806), CTS 808 (also referred to as MP$_{b,k1}$ 808), and CTS 810 (also referred to as MP$_{b,k2}$ 810). In an embodiment, the CTS 804, CTS 806, CTS 808, and CTS 810 each can be PMOS transistors. Note that, in comparison to the conventional charge pump, the system 800 utilizes PMOS CTSs 804 and 808 in place of NMOS CTSs (e.g., NMOS CTSs 306 and 308 of FIG. 3), wherein the PMOS CTSs 804 and 808 can be driven by an AGBC, as more fully disclosed herein, such that the overdrive voltages of the two PMOS CTSs 804 and 808 can be independent of the loading current. In an embodiment, the enhanced charge pump 802 can have its circuit designed using, for example, CSMC 0.35 μm low voltage CMOS process, wherein CSMC refers to CSMC Technologies Corporation.

In accordance with various other aspects, the enhanced charge pump 802 can comprise a DGBC 812, which can include a DGBC-a 814 associated with circuit path a and DGBC-b 816 associated with circuit path b. The DGBC-a 814 can include switch 818 and switch 820, wherein, in an embodiment, the switch 818 (also referred to as $MP_{a,k4}$ 818) can be a PMOS transistor, and the switch 820 (also referred to as $MN_{a,k}$ 620) can be an NMOS transistor. The DGBC-b 816 can include switch 822 and switch 824, wherein, in an embodiment, the switch 822 (also referred to as $MP_{a,k4}$ 822) can be a PMOS transistor, and the switch 824 (also referred to as $MN_{a,k}$ 624) can be an NMOS transistor.

In still other aspect, the enhanced charge pump 802 also can comprise capacitor 826 (also referred to as $C_{a,k1}$ 826) associated with circuit path a, and capacitor 828 (also referred to as $C_{b,k1}$ 828) that can be associated with circuit path b, wherein the capacitors can facilitate charge pump operation to generate a larger voltage level at the output of the enhanced charge pump 802 in response to receiving a lower voltage at the input of the enhanced charge pump 802, as more fully disclosed herein.

In yet other aspects, the enhanced charge pump 802 can contain an AGBC 830 that can include an AGBC-a 832 associated with circuit path a and AGBC-b 834 that can be associated with circuit path b. The AGBC-a 832 can comprise a switch 836 (also referred to as $MP_{a,k3}$ 836), a switch 838 (also referred to as $MP_{a,k5}$ 838), and a capacitor 840 (also referred to as $C_{a,k2}$ 840), wherein, in an embodiment the switch 836 can be a PMOS transistor and the switch 838 can be a diode-connected switch (e.g., a diode connected PMOS transistor). The AGBC-b 834 can comprise a switch 842 (also referred to as $MP_{b,k3}$ 842), a switch 844 (also referred to as $MP_{b,k5}$ 844), and a capacitor 846 (also referred to as $C_{b,k2}$ 846), wherein, in an embodiment the switch 842 can be a PMOS transistor and the switch 844 can be a diode-connected switch (e.g., a diode connected PMOS transistor).

The respective components (e.g., CTSs, DGBCs, AGBCs, capacitors, etc.) of the enhanced charge pump 802 can be the same or substantially the same as, for example, the respective components (e.g., CTSs, DGBCs, AGBCs, capacitors, switches, etc.) of the system 600 of FIG. 6, except that, in AGBC-a 832 and AGBC-b 834, the switch 638 (e.g., diode ($D_{a,k}$)) (of the AGBC-a 632) can be replaced with the switch 838, which can be a diode-connected PMOS transistor ($MP_{a,k3}$), in the AGBC-a 832, and the switch 644 (e.g., diode ($D_{a,k}$)) (of the AGBC-b 634) can be replaced with the switch 844, which can be a diode-connected PMOS transistor ($MP_{a,k3}$). In an aspect, the respective switches 838 and 844 in the AGBC 830 can provide a quick initialization of the AGBC 830. Such quick initialization of the AGBC 830 by the switches 838 and 844 can facilitate improving the power efficiency of the AGBC 830 as well as the enhanced charge pump 802 as a whole.

The enhanced charge pump 802 can be connected to a clock(s) (not shown in FIG. 8) to receive clk signal and an nclk signal; can have it input voltage node ($V_{in,k}$) connected to a standard voltage source (e.g., if the enhanced charge pump 802 is the only stage or the first stage of an enhanced multi-stage charge pump) or to the output voltage node ($V_{out,k-1}$) of an enhanced charge pump of a previous stage in an enhanced multi-stage charge pump; can have a first input node ($IN_{a,k}$) connected to an nclk clock signal generator (not shown in FIG. 8) (e.g., if the enhanced charge pump 802 is the only stage or the first stage of an enhanced multi-stage charge pump) or to a first output node ($a'_{k-1}$) of an enhanced charge pump of a previous stage in an enhanced multi-stage charge pump; and can have a second input node ($IN_{b,k}$) connected to a clk clock signal generator (not shown in FIG. 8) (e.g., if the enhanced charge pump 802 is the only stage or the first stage of an enhanced multi-stage charge pump) or to a second output node ($b'_{k-1}$) of an enhanced charge pump of a previous stage in an enhanced multi-stage charge pump. The enhanced charge pump 802 also can include an output voltage node ($V_{out,k}$) that can provide (e.g., supply) an output voltage (e.g., a higher voltage than the input voltage) to be used as desired to provide power to electronic components or devices (e.g., flash memory, liquid crystal display (LCD), etc.) or to be used as an input voltage to a next stage (e.g., k+1 stage) of an enhanced multi-stage charge pump; can include a first output voltage node (also referred to as node $a'_k$) that can be provided to a first input voltage node ($IN_{a,k+1}$) of a next stage (e.g., k+1 stage) of an enhanced multi-stage charge pump or used for another desired purpose; and can include a second output voltage node (also referred to as node $b'_k$) that can be provided to a second input voltage node ($IN_{b,k+1}$) of a next stage (e.g., k+1 stage) of an enhanced multi-stage charge pump or used for another desired purpose.

The arrangement of the respective components (e.g., CTSs, DGBCs, AGBCs, capacitors, switches, etc.) and the electronic connections between the respective components in the electronic circuit of the enhanced charge pump 802 can be the same or substantially the same as that described herein with regard to the enhanced charge pump 602 of the system 600 of FIG. 6, except for the difference between switch 838 in relation to switch 638 (of enhanced charge pump 602) and the difference between switch 844 in relation to switch 644 (of enhanced charge pump 602). Also, the enhanced charge pump 802, and the respective components therein, can function the same or substantially the same as respective components of the enhanced charge pump 602 of system 600 in FIG. 6. Note that there is little or no performance degradation in the enhanced charge pump 802 by employing diode-connected transistors (e.g., switch 838 and switch 844) in the AGBC 830 instead of diodes ($D_{a,k}$) as in the AGBC 630.

Figure 9:
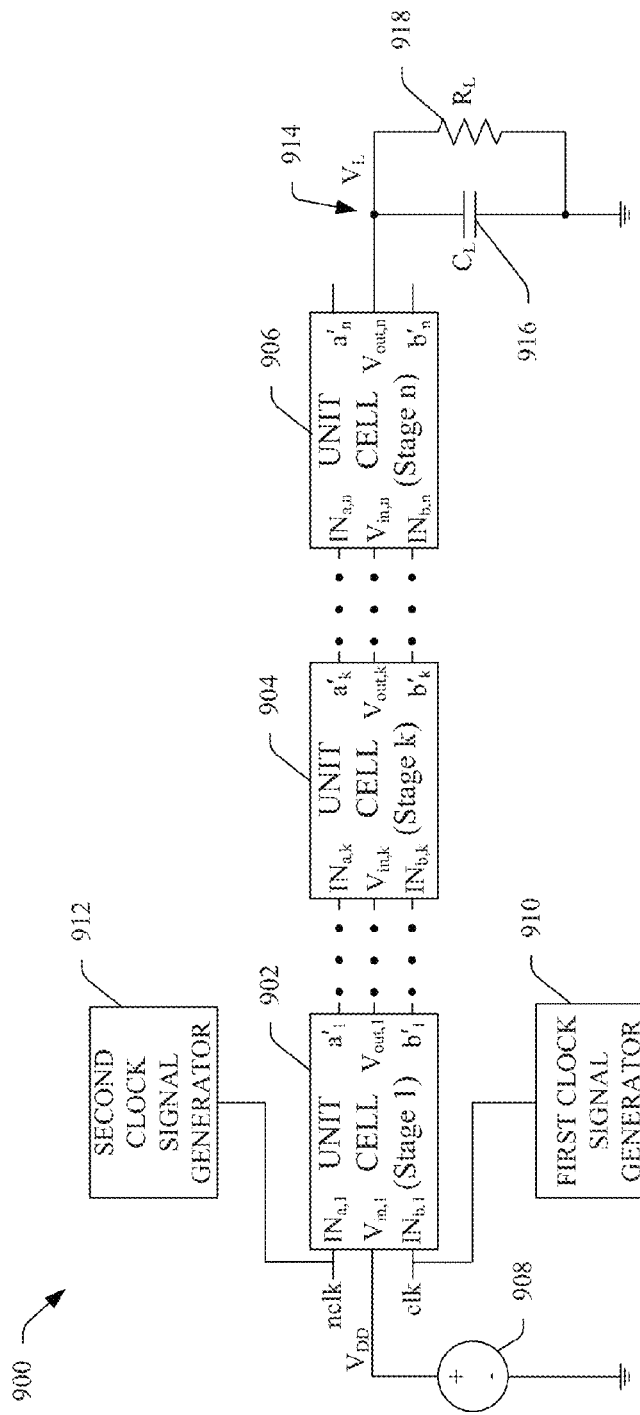
FIG. 9 depicts a diagram of an example system employing multiple enhanced charge pumps to form an enhanced multi-stage charge pump to generate a higher voltage at an output based on a lower input voltage, in accordance with various embodiments and aspects of the disclosed subject matter.

Referring to FIG. 9 (along with FIGS. 6 and 8), depicted is a diagram of an example system 900 employing multiple enhanced charge pumps (e.g., enhanced charge pump 602, enhanced charge pump 802) to form an enhanced multi-stage charge pump to generate a higher voltage at an output based on a lower input voltage, in accordance with various embodiments and aspects of the disclosed subject matter. The system 900 can be or can comprise an enhanced multi-stage charge pump (e.g., enhanced multi-stage cross-coupled switched-capacitor charge pump). To achieve a higher output voltage, the system 900 can include multiple unit cells (e.g., n unit cells, wherein n is a desired integer number), such as unit cell 902 at Stage 1, unit cell 904 for Stage k, and unit cell 906 for Stage n, wherein each of the unit cells can be an enhanced charge pump, such as, for example, charge pump 602 or charge pump 802.

In an aspect, the unit cells can be cascaded as shown in FIG. 9, wherein unit cell 902 can receive an input voltage $V_{DD}$ from voltage source 908 at the input $V_{in,1}$ of the unit cell 902, and can provide its output voltage $V_{OUT,1}$ to the input (e.g., $V_{in,k}$) of the unit cell of the input of the next stage, Stage 2, wherein, if the system 900 includes 3 stages (e.g., n=3), unit cell 904 can be Stage 2 with k=2, and unit cell 906 can be Stage 3 with n=3, and the unit cell 904 can provide its output voltage $V_{OUT,2}$ to the input $V_{in,n}$ of the unit cell 906 of Stage 3.

The system 900 also can include a first clock signal generator 910 and a second clock signal generator 912 that each can be connected to each of the unit cells 902, 904, and 906 to facilitate operation of the system 900. For instance, the first clock signal generator 910 can generate and provide a first clock signal (clk) and the second clock signal generator 912 can generate and provide a second clock signal (nclk), which can be complementary to the first clock signal (e.g., the second clock signal can be opposite in phase in relation to the first clock signal). The first clock signal generator 910 can provide the first clock signal to the input $IN_{b1}$ of unit cell 902, and to the respective flying capacitors (e.g., 824) and the AGBC-a's (e.g., 632, 832) associated with circuit path a of each of the unit cells 902, 904, and 906. The second clock signal generator 912 can provide the second clock signal to the input $IN_{a1}$ of unit cell 902, and to the respective flying capacitors (e.g., 826) and AGBC-b's (e.g., 634, 834) associated with circuit path b of each of the unit cells 902, 904, and 906. It is to be appreciated and understood that, in accordance with another embodiment, as desired, a single clock component can be employed to generate and provide both the first clock signal and second clock signal.

$V_L$ 914, $C_L$ 916, and $R_L$ 918 are the output voltage, output capacitor and output load of the enhanced multi-stage charge pump (e.g., enhanced multi-stage cross-coupled switched-capacitor charge pump), respectively, wherein $V_L$ 914 is the voltage output from the unit cell 906, which is the last stage, Stage n, of the system 900. As a result, $V_{in,k}$ in the k-th stage equals to $V_{OUT}$ of the (k−1)-th stage. Therefore, theoretically a cross-coupled charge pump with n stages cascaded can achieve an output voltage equal to $(n+1)V_{DD}$. As disclosed, the driving power of this charge pump is determined by the equivalent series resistance observed at the output node of the charge pump, which is also known as the output resistance $R_{out}$ of the charge pump. Due to the voltage drop across $R_{out}$, the actual output voltage observed at the output of the charge pump is given by $$V_L = (n+1)V_{DD} - I_L R_{out},\quad \text{(Eq. 1)}$$

where $I_L$ is the output loading current or driving current of the charge pump, and $I_L R_{out}$ is known as the output voltage drop. Note that the output voltage drops linearly proportional to the output resistance of the switched capacitor charge pump. Therefore, a small output voltage drop can be designed by reducing $R_{out}$, since the output resistance of a cross-coupled switched-capacitor charge pump is inversely proportional to the switching frequency of the cross-coupled switched-capacitor charge pump, the flying capacitors (e.g., 824, 826), the on-resistance of the CTS transistors (e.g., 804, 806, 808, and 810), and the overdrive voltage $V_O$ for the CTS of the last stage of the cascaded switched-capacitor charge pump. The enhanced charge pumps (e.g., enhanced single-stage charge pump, enhanced multi-stage charge pump), by employing the DGBCs and/or AGBCs, as disclosed herein, can desirably enable a reduction in $R_{out}$, and can maintain desirable overdrive voltage levels over a wide variety of current loading conditions.

Figure 10:
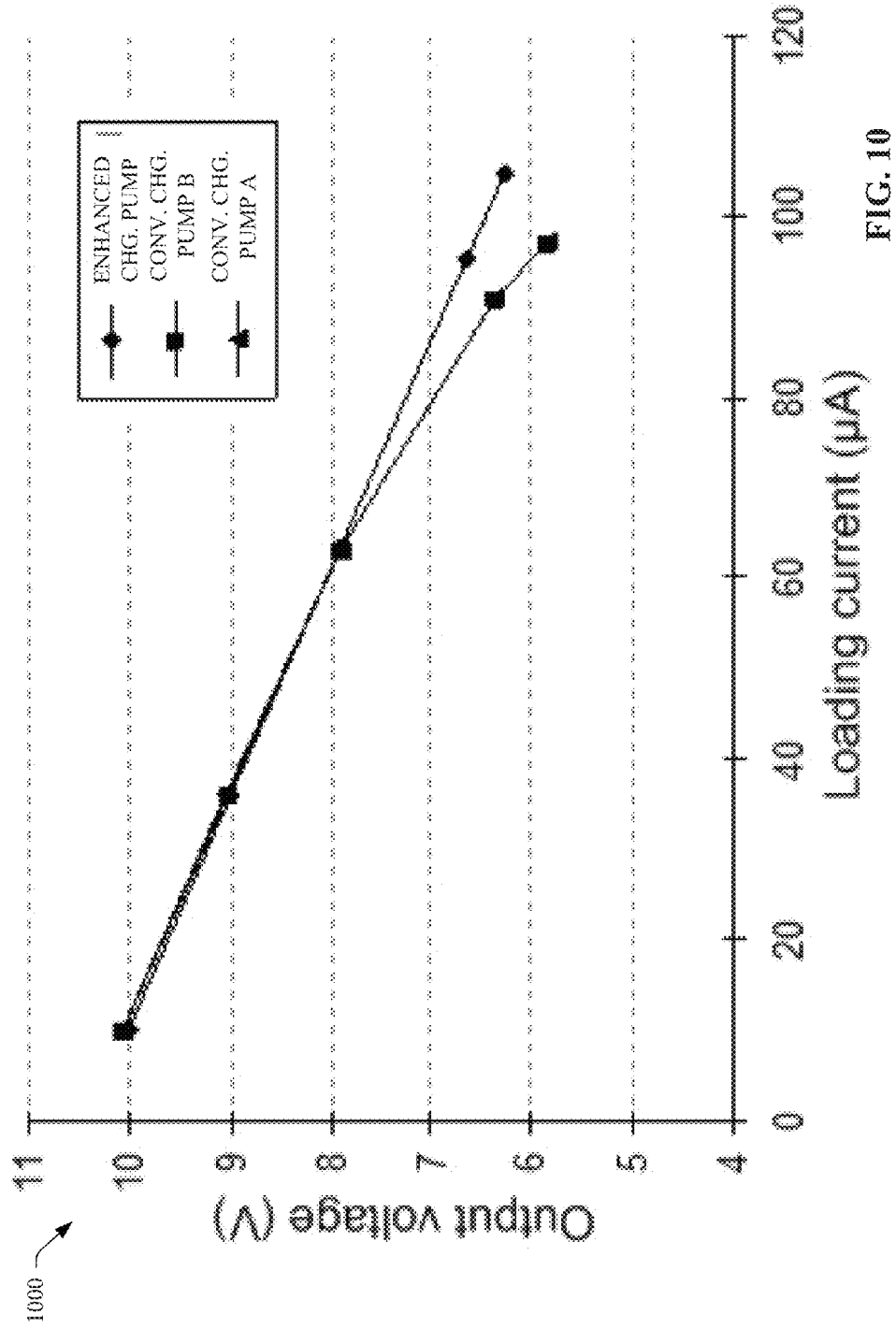
FIG. 10 depicts a diagram of an example graph 1000 that includes information demonstrating the performance of an enhanced multi-stage charge pump as compared to one type of conventional charge pump.
Figure 11:
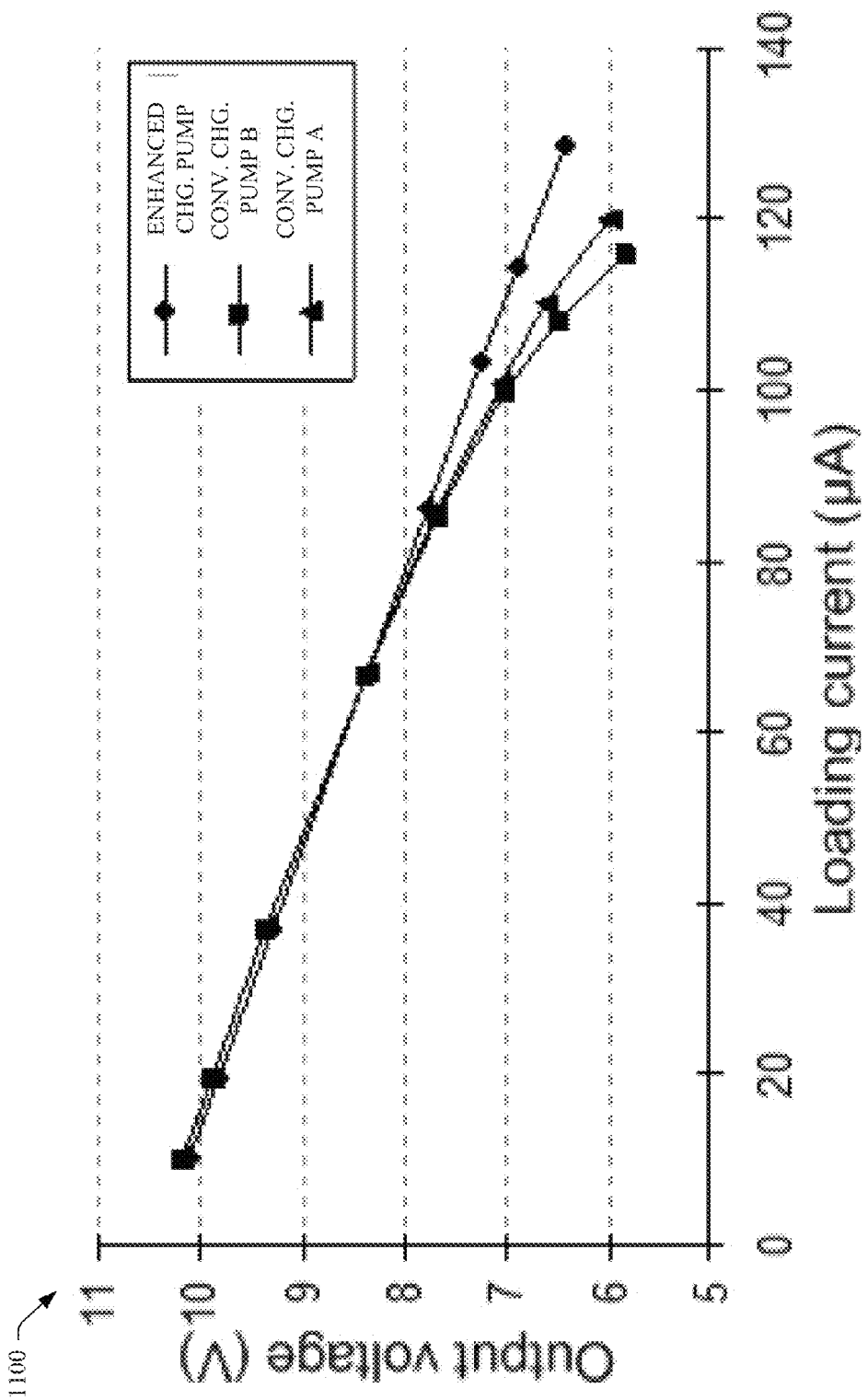
FIG. 11 illustrates a diagram of another example graph 1100 that includes information demonstrating the performance of the enhanced multi-stage charge pump as compared to conventional charge pumps.

To illustrate the improved performance of the enhanced charge pumps over conventional cross-coupled switched-capacitor charge pumps, FIGS. 10 and 11 respectively depict graph 1000 and graph 1100 which include information demonstrating the performance of the enhanced multi-stage charge pump (e.g., enhanced 6-stage charge pump using enhanced charge pump 802 in each of the stages) (referred to as Enhanced Chg. Pump in FIG. 10) as compared to conventional charge pumps, such as the charge pump described in R. Pelliconi, et al., "Power Efficient Charge Pump in Deep Submicron Standard CMOS Technology," IEEE Journal of Solid-State Circuits, pp. 1068-1071, June 2003 (also referred to as Conventional Charge Pump A (referred to as Cony. Chg. Pump A in FIG. 10)), and Cabrini, et al., "Enhanced Charge Pump for Ultra-Low-Voltage Applications," Electronic Letters, pp. 512-514, vol. 42, no. 9, 2006 (also referred to as Conventional Charge Pump B (referred to as Cony. Chg. Pump B in FIG. 10)).

In accordance with an embodiment of the disclosed subject matter, the enhanced multi-stage charge pump can be designed with CSMC 0.35 μm low voltage CMOS process. The six stages of the enhanced multi-stage charge pump can be cascaded in accordance with FIG. 9, and diode-connected PMOS transistors ($MP_{a,k5}$, $MP_{b,k5}$) are used, instead of diodes ($D_{a,k}$, $D_{b,k}$), to facilitate seamless integration into the modern CMOS process. Note that there is minimal or no performance degradation in the enhanced 2-phase cross-coupled switched-capacitor charge pump with the diodes being implemented with diode-connected PMOS transistors. The sizes of the transistors and capacitors of each unit cell of the enhanced multi-stage charge pump are shown in Table I.

TABLE 1

| Transistors | W/L (μm/μm) | Transistors | W/L (μm/μm) |
|---|---|---|---|
| $MP_{a,k1}$, $MP_{b,k1}$ | 12/0.35 | $MP_{a,k2}$, $MP_{b,k2}$ | 12/0.35 |
| $MP_{a,k3}$, $MP_{b,k3}$ | 2/0.35 | $MP_{a,k4}$, $MP_{b,k4}$ | 2/0.35 |
| $MP_{a,k5}$, $MP_{b,k5}$ | 2/0.35 | $MN_{a,k}$, $MP_{b,k}$ | 1/0.35 |
| Capacitors | Capacitance (pF) | Capacitors | Capacitance (pF) |
| $C_{a,k1}$, $C_{b,k1}$, $C_L$ | 50 | $C_{a,k2}$, $C_{b,k2}$ | 1 |

In an aspect, the sizes of the transistors and capacitors in the DGBCs and the AGBCs are much smaller than those used to drive the flying capacitors ($C_{a,k1}$, $C_{b,k1}$) and the CTSs (e.g., 804, 806, 808, 810). This is because the DGBCs and the AGBCs are only required to drive the gate capacitors of the CTS transistors only, which has much smaller capacitive loading when compared to that of the flying capacitors.

As can be seen in graph 1000 and graph 1100, the enhanced multi-stage charge pump of system 900, when cascading 6 stages of enhanced charge pumps 802, is observed to perform significantly better than conventional cross-coupled switched-capacitor charge pumps, such as, for example, Conventional Charge Pump A and Conventional Charge Pump B. For fair and accurate comparison, the sizes of the PMOS CTS, the size of the flying capacitors, and the sizes of the transistors and capacitors in the auxiliary circuits (e.g., conventional auxiliary circuits of Conventional Charge Pump A and Conventional Charge Pump B, and the AGBCs of the enhanced multi-stage charge pump) are the same for each of the enhanced multi-stage charge pump, Conventional Charge Pump A and Conventional Charge Pump B (e.g., 2-phase cross-coupled switched-capacitor charge pumps), and the sizes of the NMOS CTS (of Conventional Charge Pump A and Conventional Charge Pump B) are chosen to be ¼ the size of that of the PMOS CTS of the enhanced multi-stage charge pump.

Graph 1000 and graph 1100 respectively show the respective output voltages of the enhanced multi-stage charge pump (in graphs 1000 and 1100), Conventional Charge Pump A (in graph 1100) and Conventional Charge Pump B (in graphs 1000 and 1100) with $V_{DD}=1.5V$ at different output currents ranging from approximately 10 μA to over 100 μA, and switching frequencies at 1.5 MHz (in graph 1000) and 2 MHz (in graph 1100). As can be seen in graph 1000 and graph 1100, the enhanced multi-stage charge pump generates and provides a higher output voltage, particularly at higher loading currents, than the output voltages produced by Conventional Charge Pump A and Conventional Charge Pump B. In comparing the respective results of graph 1000 and graph 1100, it can be observed that higher output voltages can be obtained for the enhanced multi-stage charge pump, Conventional Charge Pump A and Conventional Charge Pump B when operated at 2 Mhz, as compared to when operated at 1.5 Mhz, as the respective output resistances of the respective charge pumps are smaller, in accordance with Eq. (2). Another advantage of the disclosed subject matter is that the pumping efficiencies of the enhanced multi-stage charge pump with switching frequencies at 2 MHz and 1.5 MHz and a loading current of 10 µA is observed to be as high as 96% and 95%, respectively, which is an improvement over conventional charge pumps.

Still another advantage of the enhanced multi-stage charge pump, which can be observed in the graphs 1000 and 1100, is that the voltage drop observed at the output node of the enhanced multi-stage charge pump shows a linear, or at least a substantially linear, decrement with an increasing output current, which implies that the output resistance of the enhanced multi-stage charge pump is maintained to be constant, or at least substantially constant, over a wide range of output currents. This is the direct consequence of maintaining the overdrive voltages of all of the CTSs in the enhanced multi-stage charge pump over a wide range of output currents. In contrast, the output voltage drops of Conventional Charge Pump A and Conventional Charge Pump B as the loading current increases are observed to be larger than that of the enhanced multi-stage charge pump. This is because the on-resistance of some of the CTSs in Conventional Charge Pump A and Conventional Charge Pump B increase in response to an increasing loading current.

Figure 12:
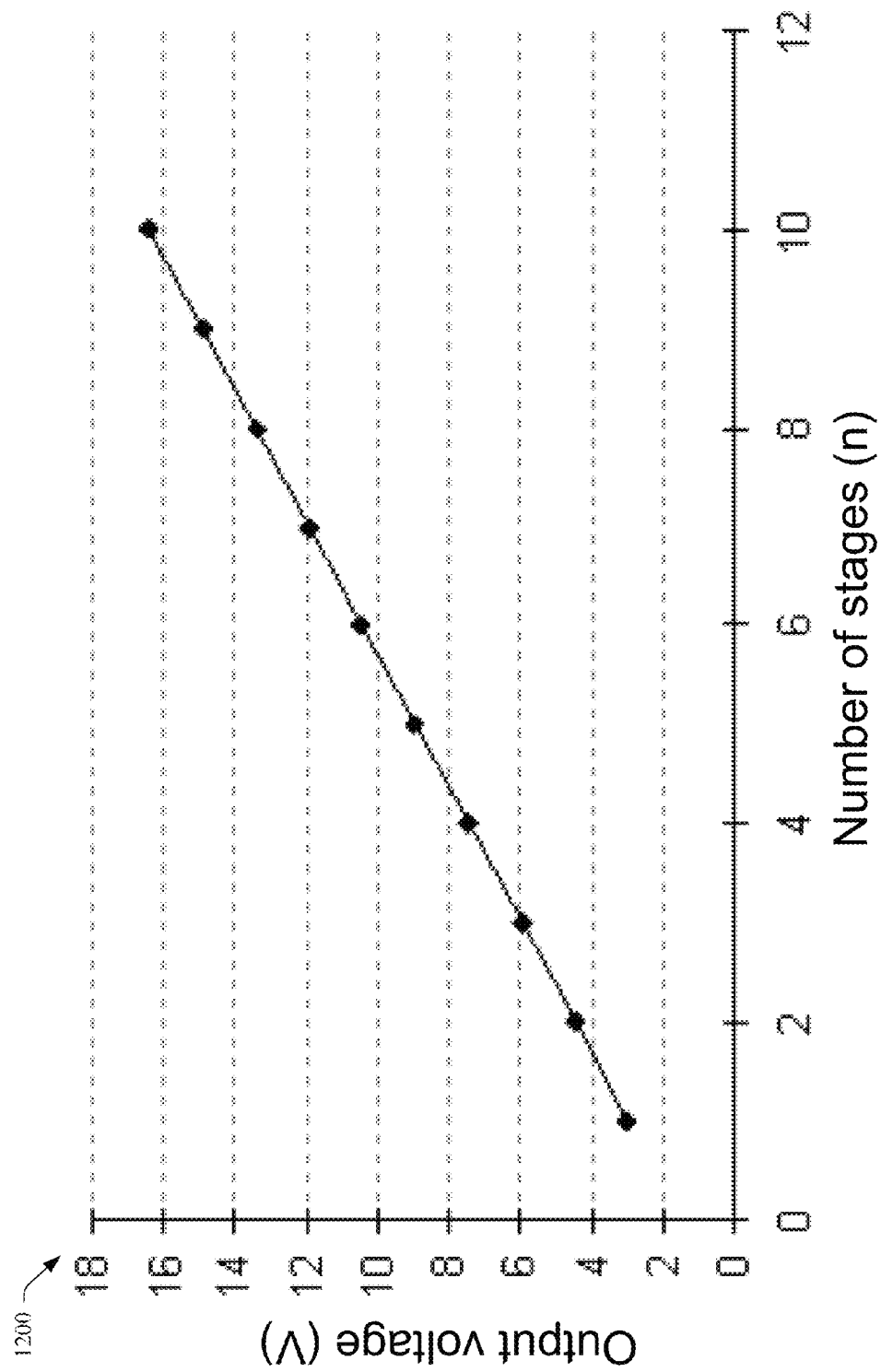
FIG. 12 is a diagram of an example graph that shows the respective output voltages of enhanced charge pumps with various numbers of stages (n).

FIG. 12 illustrates a diagram of an example graph 1200 showing the respective output voltages of enhanced charge pumps with various numbers of stages (n). The respective enhanced charge pumps (e.g., enhanced single-stage charge pump, enhanced multi-stage charge pump) are operated at $V_{DD}$=1.5V and switching frequency f=2 MHz with open load. In graph 1200, it can be observed that the voltage gain obtained from the enhanced charge pump is nearly ideal with 2 to 10 (n=2 through n=10) cascade stages. No threshold voltage drop problem is observed in the enhanced charge pump, as the threshold voltage is maintained, or at least substantially maintained, for the enhanced charge pumps respectively having one or more stages (e.g., 1 though 10 stages or more).

Figure 13:
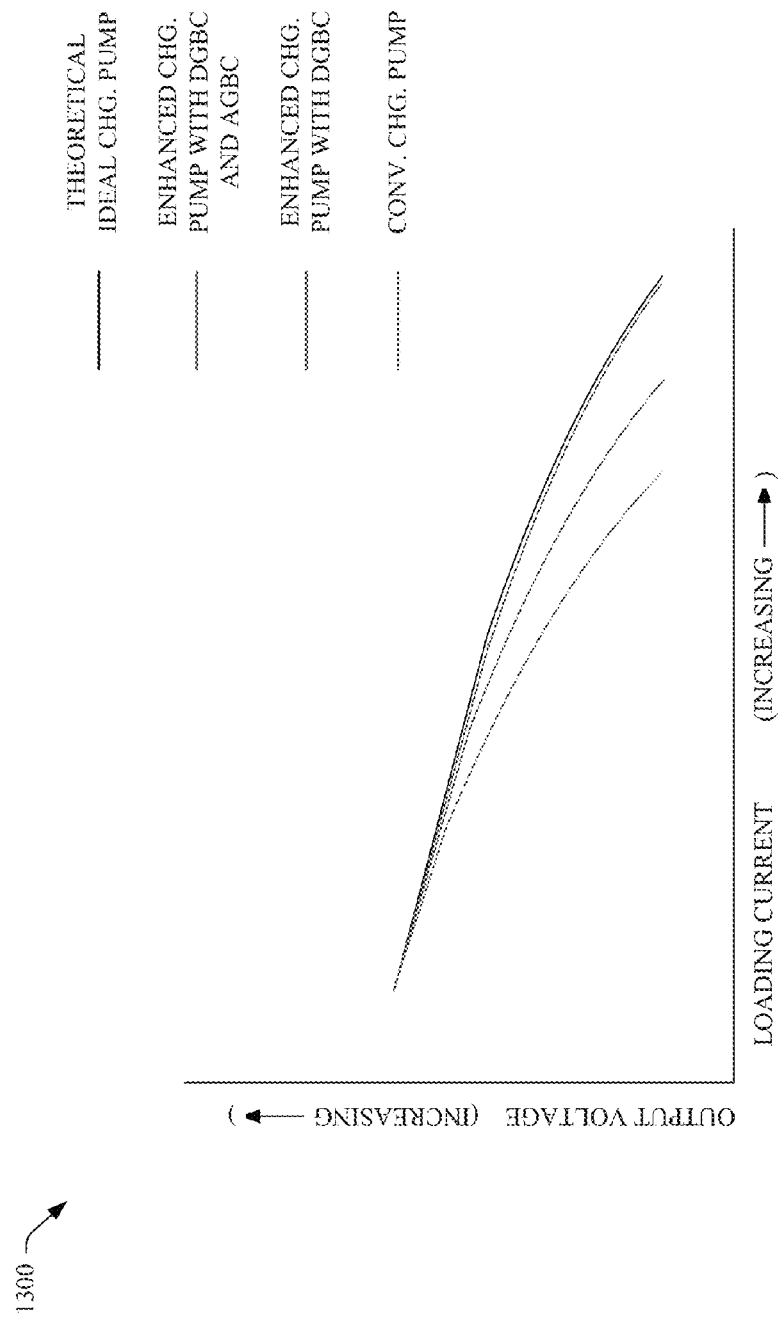
FIG. 13 depicts an example graph demonstrating an approximation of the respective effects of employing DGBCs and/or AGBCs in the enhanced charge pump as compared to a conventional charge pump over various loading currents.

FIG. 13 depicts an example graph 1300 demonstrating an approximation of the respective effects of employing DGBCs and/or AGBCs in the enhanced charge pump as compared to a conventional charge pump over various loading currents. As can be seen in the graph 1300, when an enhanced charge pump comprises DGBCs and AGBCs (referred to as ENHANCED CHG. PUMP WITH DGBC AND AGBC in FIG. 13), the performance of such enhanced charge pump can be substantially close to ideal performance (e.g., performance of a theoretical 100% efficient charge pump) (referred to as THEORETICAL IDEAL CHG. PUMP in FIG. 13), as this enhanced charge pump can maintain, or at least substantially maintain, close to the ideal output voltage over various loading currents, including large loading currents (e.g., over 100 µA). The performance of this enhanced charge pump can be significantly better than the performance of the conventional charge pump (referred to as CONV. CHG. PUMP in FIG. 13), and also can be better than an enhanced charge pump comprising DGBCs but no AGBCs (referred to as ENHANCED CHG. PUMP WITH DGBC in FIG. 13). As also can be seen in the graph 1300, when an enhanced charge pump comprises DGBCs but no AGBCs, the performance of such enhanced charge pump still can be substantially better than a conventional charge pump.

The enhanced charge pump of the subject specification can provide a high current driving capability. The DGBC and AGBC of the enhanced charge pump can desirably maintain the overdrive voltages of associated CTSs, even for larger loading currents (e.g., greater than 60 µA). The enhanced charge pump can operate such that the largest voltage difference between any of the terminals of all of the transistors does not exceed the supply voltage $V_{DD}$. The enhanced charge pump can thereby minimize or eliminate the gate-oxide stress problem found in conventional charge pumps and has improved reliability over conventional charge pumps.

Still other advantages of the enhanced charge pump is that the enhanced charge pump can have a higher pumping efficiency than conventional charge pumps, because the enhanced charge pump experiences no, or very close to no, threshold voltage drop, and 2-phase operation without the need of extra power consumption on the logic circuits and drivers. The enhanced charge pump is also more efficient with regard to silicon area used, as the DGBC and AGBC can utilize less silicon area than conventional logic circuits and drivers for charge pumps.

In an embodiment, a triple well process can be used for the electronic circuit of an enhanced charge pump. Even while utilizing a triple well process, the maximum voltage between the gate, source, drain and substrate of each transistor (e.g., CTS) can be maintained at the supply voltage $V_{DD}$. Further, the enhanced charge pump can provide high voltage gain while using low voltage transistors. This is beneficial because low voltage transistors have lower threshold voltages and less parasitic elements when compared with high voltage transistors. The enhanced charge pump can provide a better solution for implementation of an area-efficient, reliable and high-driving capability charge pump in a triple well process when compared to conventional charge pumps.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

It is to be further appreciated and understood that, while some of the example systems disclosed herein have described MOSFET transistors used as switches, the subject specification is not so limited, as in accordance with various embodiments and aspects, virtually any desired type of electronic switch, such as a semi-conductor switch device, can be employed to facilitate desired switching, for example, in relation to desired converting of an input voltage to a desired output voltage. For example, a switch (e.g., transistor, CTS, etc.) can be another type of field-effect-transistor (FET) (e.g., junction FET (JFET)), insulated gate bipolar transistor (IGBT), metal-semiconductor FET (MESFET)), bipolar junction transistor (BJT), or other type of transistor.

In view of the example systems and/or devices described herein, example methods that can be implemented in accordance with the disclosed subject matter can be better appreciated with reference to flowcharts in FIGS. 14-18. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification.

Figure 14:
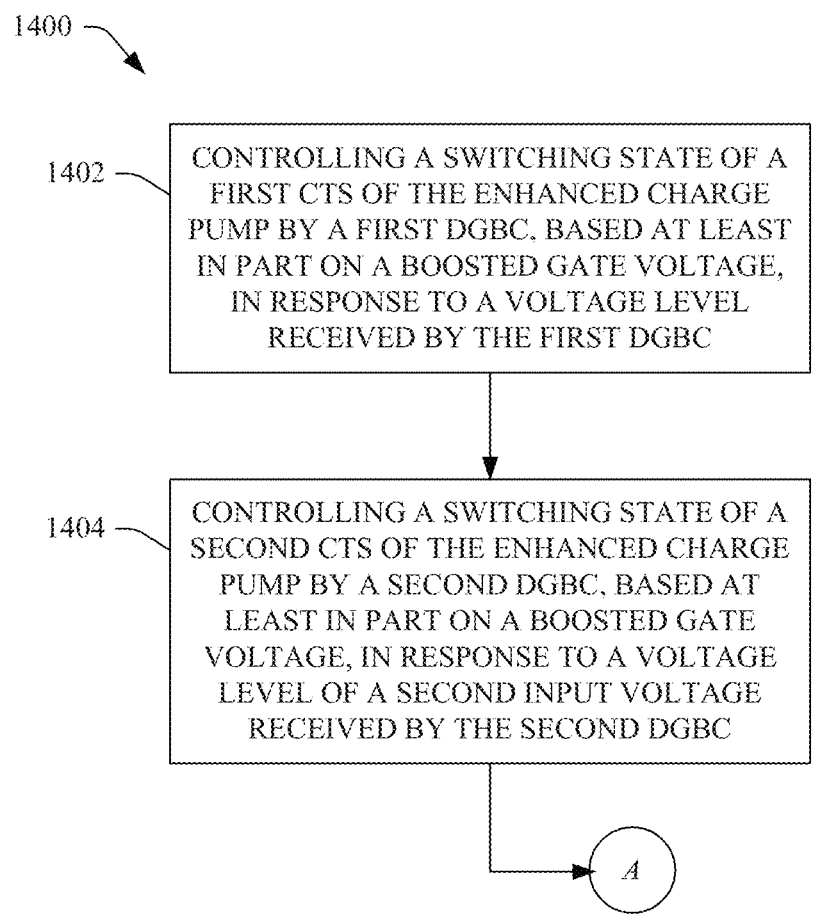
FIG. 14 presents a flowchart of an example method for employing DGBCs to facilitate controlling switching of CTSs of an enhanced charge pump to facilitate producing a desired output voltage in accordance with various aspects and embodiments of the disclosed subject matter.

FIG. 14 presents a flowchart of an example method 1400 for employing DGBCs to facilitate controlling switching of CTSs of an enhanced charge pump to facilitate producing a desired output voltage in accordance with various aspects and embodiments of the disclosed subject matter. At 1402, a switching state of a first CTS of the enhanced charge pump can be controlled by a first DGBC (e.g., DGBC-a), based at least in part on a boosted gate voltage (e.g., applied to the first gate of the first CTS by the first DGBC during specified time periods), in response to a voltage level received by the first DGBC. The first CTS and the first DGBC can be associated with a first circuit path (e.g., circuit path a) of the enhanced charge pump. In an aspect, the first DGBC can be associated with a first gate of the first CTS. The first DGBC can control the voltage level applied to the first gate of the first CTS and, as a result, the switching state of the first CTS, based at least in part on (e.g., in response to receiving) the voltage level of a first input voltage $IN_{a,k}$ or the voltage level at the node $a_k$, being applied to the first gate of the first CTS at various times (e.g., during clock period $\Phi_1$ with clk=$V_{DD}$ and nclk=0V when the first flying capacitor is in the pumping phase, the first DGBC can switch on the first CTS; during clock period $\Phi_2$ with clk=0V and nclk=$V_{DD}$ when the first flying capacitor is in the charging phase, the first DGBC can apply a high boosted gate voltage (e.g., voltage level at the node $a_k$) to the gate of the first CTS to switch off the first CTS).

At 1404, a switching state of a second CTS of the enhanced charge pump can be controlled by a second DGBC (e.g., DGBC-b), based at least in part on a boosted gate voltage (e.g., applied to the second gate of the second CTS by the second DGBC during other specified time periods (e.g., time periods opposite in phase to the specified time periods associated with circuit path a)), in response to a voltage level of a second input voltage received by the second DGBC, wherein the respective controlling of the switching states of the first CTS and second CTS can facilitate generating a higher output voltage $V_{out,k}$ at the output of the enhanced charge pump based at least in part on an input voltage $V_{in,k}$ received by the enhanced charge pump. The second CTS and the second DGBC can be associated with a second circuit path (e.g., circuit path b) of the enhanced charge pump. In accordance with an aspect, the second DGBC can be associated with a second gate of the second CTS. The second DGBC can control the voltage level applied to the second gate of the second CTS and, as a result, the switching state of the second CTS, based at least in part on (e.g., in response to receiving) the voltage level of a second input voltage $IN_{b,k}$ or the voltage level at the node $b_k$, at various times (e.g., clock period $\Phi_1$ with clk=$V_{DD}$ and nclk=0V, when the second flying capacitor is in the charging phase, the second DGBC can apply a high boosted gate voltage (e.g., voltage level at the node $b_k$) to the gate of the second CTS to switch off the second CTS; clock period $\Phi_2$ with clk=0V and nclk=$V_{DD}$ when the second flying capacitor is in the pumping phase, the second DGBC can switch on the second CTS). At this point, as desired, in accordance with an embodiment, the method 1400 can proceed to reference point A, and method 1500 can proceed from reference point A with regard to employing AGBCs with DGBCs to facilitate operating the enhanced charge pump. As desired, in accordance with another embodiment, the method 1400 can end at this point.

Figure 15:
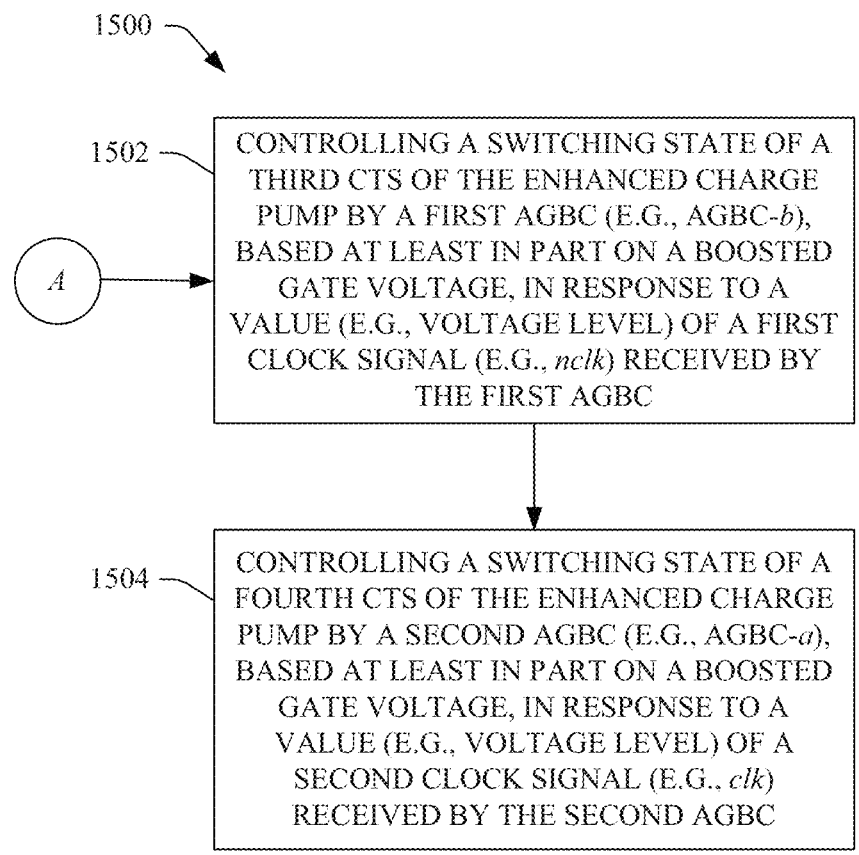
FIG. 15 depicts a flowchart of an example method for employing DGBCs and AGBCs to facilitate controlling switching of CTSs of an enhanced charge pump to facilitate producing a desired output voltage in accordance with various aspects and embodiments of the disclosed subject matter.

FIG. 15 depicts a flowchart of an example method 1500 for employing DGBCs and AGBCs to facilitate controlling switching of CTSs of an enhanced charge pump to facilitate producing a desired output voltage in accordance with various aspects and embodiments of the disclosed subject matter. The method 1500 can proceed from reference point A of method 1400, wherein method 1400 relates to operation of an enhanced charge pump comprising DGBCs. Method 1500 relates to operation of an enhanced charge pump comprising DGBCs and AGBCs. At 1502, a switching state of a third CTS of the enhanced charge pump can be controlled by a first AGBC (e.g., AGBC-b), based at least in part on a boosted gate voltage (e.g., applied to the third gate of the third CTS by the first AGBC during the specified time periods), in response to a value (e.g., voltage level) of a first clock signal (e.g., nclk) received by the first AGBC. The third CTS can be associated with a first circuit path, and the first AGBC can be associated with the second circuit path, of the enhanced charge pump. The first AGBC also can be associated with a third gate of the third CTS to facilitate controlling switching of the fourth CTS. For instance, over various time periods, the first AGBC can control the voltage level applied to the third gate of the third CTS and, as a result, can control the switching state of the third CTS, based at least in part on (e.g., in response to receiving) the first clock signal (nclk) at various times periods (e.g., clock period $\Phi_1$ with nclk=0V, clock period $\Phi_2$ with nclk=$V_{DD}$).

At 1504, a switching state of a fourth CTS of the enhanced charge pump can be controlled by a second AGBC (e.g., AGBC-a), based at least in part on a boosted gate voltage (e.g., applied to the fourth gate of the fourth CTS by the second AGBC during the other specified time periods), in response to a value (e.g., voltage level) of a second clock signal (e.g., clk) received by the second AGBC, wherein first AGBC and the fourth CTS are associated with a first circuit path, and the second AGBC and the third CTS are associated with a second circuit path, and wherein the respective controlling of the switching states of the third CTS and the fourth CTS can facilitate generating respective overdrive voltages associated with the third CTS and the fourth CTS. The operation of the AGBCs can facilitate controlling operations of the enhanced charge pump to generate a higher output voltage $V_{out,k}$ at the output of the enhanced charge pump based at least in part on an input voltage $V_{in,k}$ received by the enhanced charge pump. The second AGBC can be associated with a fourth gate of the fourth CTS. The second AGBC can control the voltage level applied to the fourth gate of the fourth CTS and, as a result, can control the switching state of the fourth CTS, based at least in part on (e.g., in response to receiving) the second clock signal at various time periods (e.g., clock period $\Phi_1$ with clk=$V_{DD}$, clock period $\Phi_2$ with clk=0V).

Figure 16:
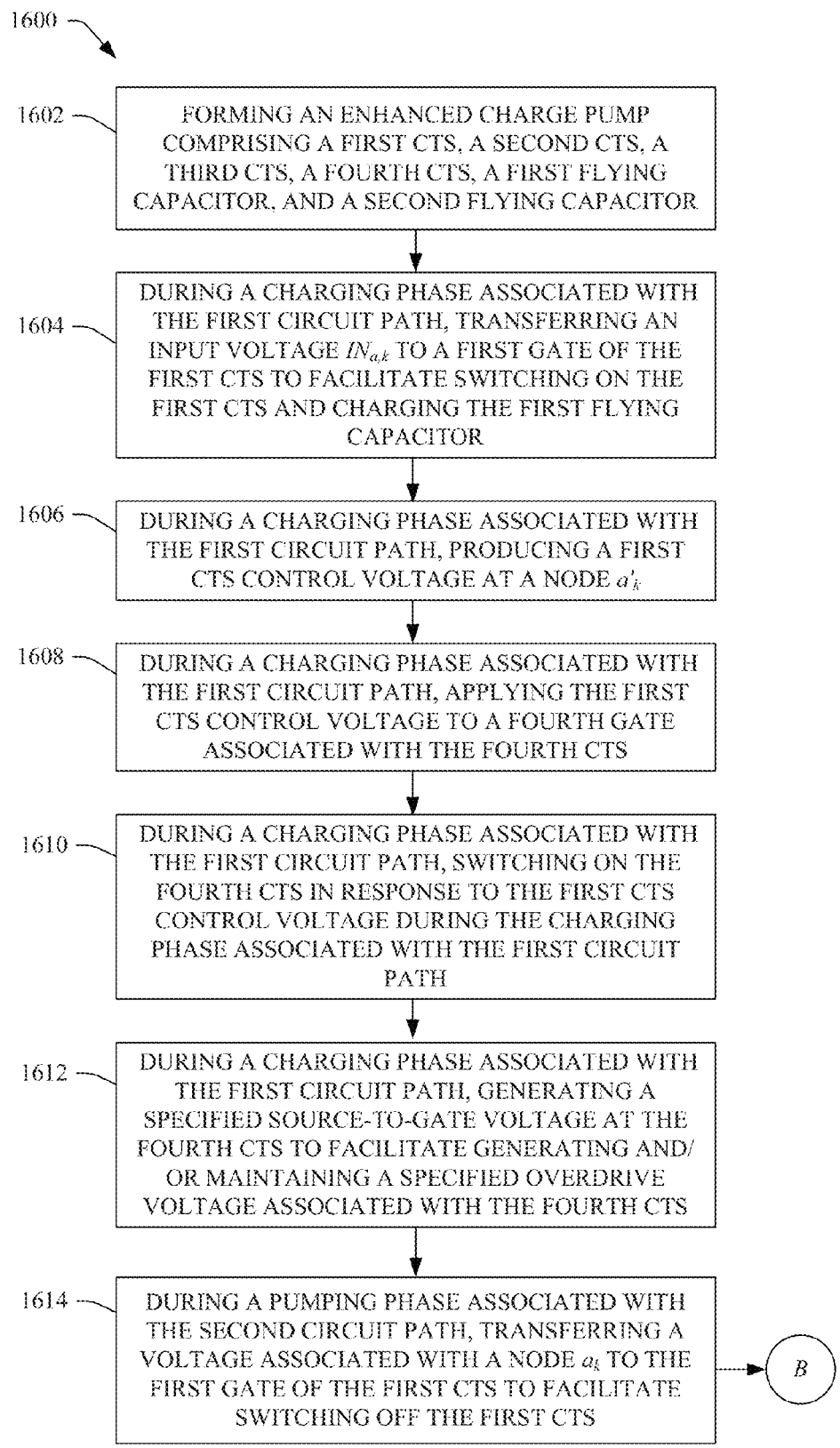
FIGS. 16 and 17 illustrate a flowchart of another example method that can facilitate controlling switching of CTSs in an enhanced charge pump to facilitate producing a desired output voltage in accordance with various aspects and embodiments of the disclosed subject matter.
Figure 17:
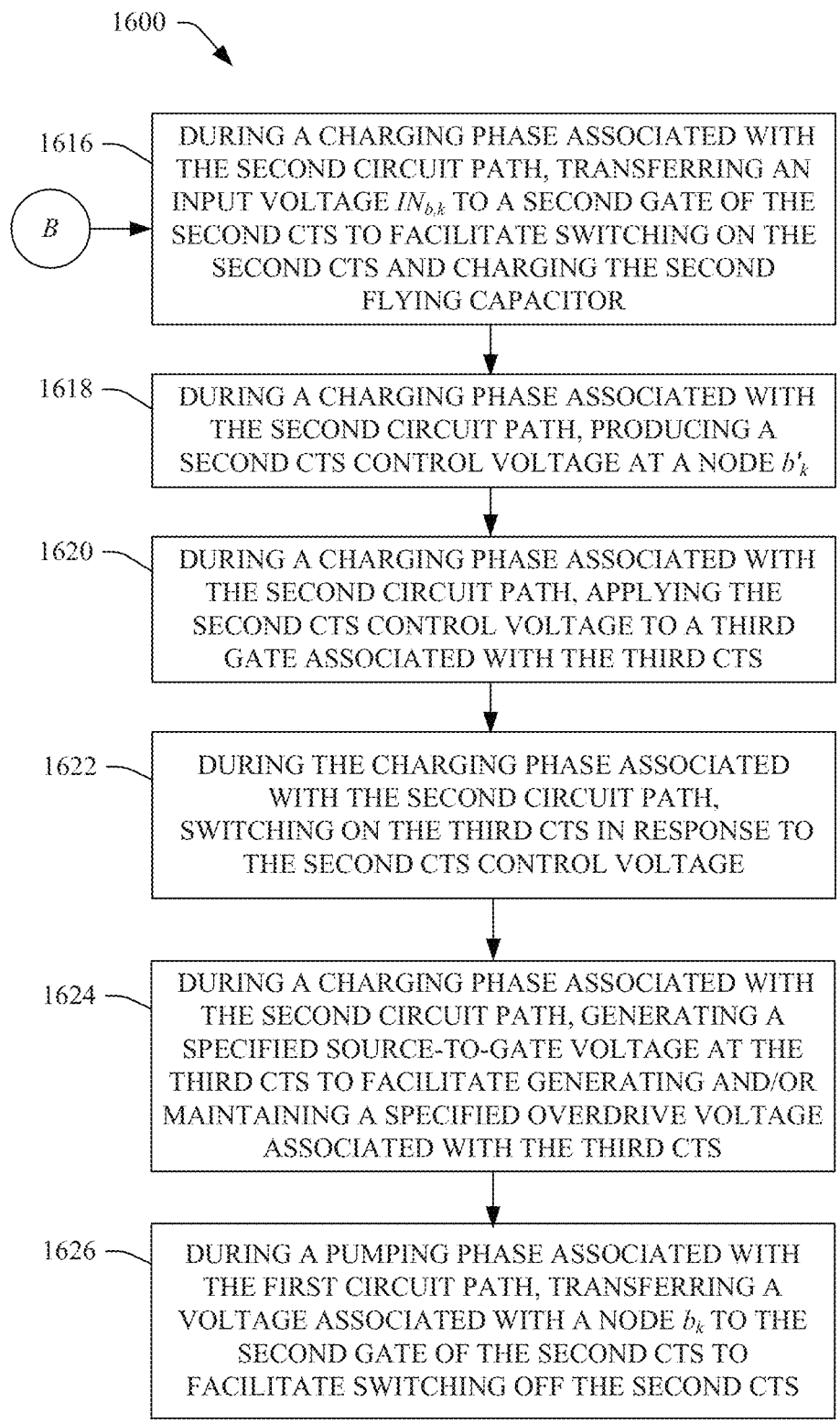

FIGS. 16 and 17 illustrate a flowchart of another example method 1600 that can facilitate controlling switching of CTSs in an enhanced charge pump to facilitate producing a desired output voltage in accordance with various aspects and embodiments of the disclosed subject matter. At 1602, the enhanced charge pump can be formed comprising a first CTS ($MP_{a,k1}$), a second CTS ($MP_{b,k1}$), a third CTS ($MP_{a,k2}$), a fourth CTS ($MP_{b,k2}$), a first flying capacitor ($C_{a,k1}$), and a second flying capacitor ($C_{b,k1}$), wherein the first CTS and the third CTS are associated with a first circuit path (e.g., circuit path a), and the second CTS and the fourth CTS can be associated with a second circuit path (e.g., circuit path b).

To facilitate operation of the enhanced charge pump, the enhanced charge pump can receive a first clock signal (clk), a second clock signal (nclk), a first input voltage $IN_{a,k}$, a second input voltage $IN_{b,k}$, and/or an input voltage $V_{in,k}$. The first and second clock signals can be received from one or more clock components. The first input voltage can be received from a node $a'_{k-1}$ associated with a previous charge pump stage, or, if the enhanced charge pump is the first or only stage, from a clock signal. The second input voltage can be received from a node $b'_{k-1}$ associated with a previous charge pump stage, or, if the enhanced charge pump is the first or only stage, from a clock signal. The input voltage $V_{in,k}$ can be received from the output voltage $V_{out,k-1}$ of a previous charge pump state, or, if the enhanced charge pump is the first or only stage, from a voltage source. During the respective time periods that the second CTS and fourth CTS are switched on, wherein the second CTS can be in the on state when the fourth CTS is in the off state, and vice versa, the enhanced charge pump can produce an output voltage $V_{out,k}$, which can be provided to a next charge pump stage (e.g., a next enhanced charge pump), if any, or can be utilized by an electronic device to facilitate performance of desired functions (e.g., memory operations associated with a memory device). The output voltage $V_{out,k}$ can be, or can approximately be, equal to twice the input voltage $V_{in,k}$.

At 1604, during a charging phase associated with the first circuit path, an input voltage $IN_{a,k}$ can be transferred to a first gate of the first CTS to facilitate switching on the first CTS and charging the first flying capacitor ($C_{a,k1}$), wherein the input voltage $IN_{a,k}$ can be a low voltage level. The enhanced charge pump can include a first DGBC (e.g., DGBC-a) associated with the first circuit path, wherein, in response to the input voltage $IN_{a,k}$ and/or a received clock signal (e.g., clk), the first DGBC can operate to facilitate controlling a voltage applied or transferred to the first gate of the first CTS to facilitate controlling switching of the first CTS. During this time, the third CTS can be in an off state, wherein a gate voltage at a third gate of the third CTS can be as high as the output voltage ($V_{out,k}$) of the enhanced charge pump to facilitate switching the third CTS to the off state.

At 1606, during the charging phase associated with the first circuit path, a first CTS control voltage can be produced at a node $a'_k$. In an aspect, the enhanced charge pump can contain a first AGBC (e.g., AGBC-a) associated with the first circuit path, wherein the first AGBC can operate to produce the first CTS control voltage. The first CTS control voltage can be equal to $Vp_{a,k}-V_{DD}$. At 1608, the first CTS control voltage can be applied to a fourth gate associated with the fourth CTS to facilitate controlling switching of the fourth CTS. At 1610, the fourth CTS can be switched on in response to the first CTS control voltage during the charging phase associated with the first circuit path. At 1612, a specified source-to-gate voltage can be generated at the fourth CTS to facilitate generating and/or maintaining a specified overdrive voltage associated with the fourth CTS. The first source-to-gate voltage can be $Vp_{b,k}-(Vp_{b,k}-V_{DD})$, and the specified overdrive voltage can be $V_{DD}-V_{th}$.

At 1614, during a pumping phase associated with the second circuit path, a voltage associated with a node $a_k$ can be transferred to the first gate of the first CTS to facilitate switching off the first CTS, wherein the voltage associated with the node $a_k$ can be a high level voltage. The pumping phase of the second circuit path can be occurring at the same time the charging phase of the first circuit path is occurring. At this point, the method 1600 can proceed to reference point B, wherein the method 1600 can continue from reference point B, as shown in FIG. 17 and described herein.

As illustrated in FIG. 17, proceeding from reference point B to reference numeral 1616, at 1616, during a charging phase associated with the second circuit path, an input voltage $IN_{b,k}$ can be transferred to the second gate of the second CTS to facilitate switching on the second CTS and charging the second flying capacitor ($C_{b,k1}$), wherein the input voltage $IN_{b,k}$ can be a low voltage level. In an aspect, the enhanced charge pump can include a second DGBC (e.g., DGBC-b) associated with the second circuit path, wherein, in response to the input voltage $IN_{b,k}$ and/or a received clock signal (e.g., nclk), the second DGBC can operate to facilitate controlling a voltage applied or transferred to the second gate of the second CTS to facilitate controlling switching of the second CTS. During this time, the fourth CTS can be in an off state, wherein a gate voltage at the fourth gate of the fourth CTS can be as high as the output voltage ($V_{out,k}$) of the enhanced charge pump to facilitate switching the fourth CTS to the off state.

At 1618, during the charging phase associated with the second circuit path, a second CTS control voltage can be produced at a node $b'_k$. In an aspect, the enhanced charge pump can contain a second AGBC (e.g., AGBC-b) associated with the second circuit path, wherein the second AGBC can operate to produce the second CTS control voltage. The second CTS control voltage can be equal to $Vp_{b,k}-V_{DD}$. At 1620, the second CTS control voltage can be applied to a third gate associated with the third CTS to facilitate controlling switching of the third CTS. At 1622, the third CTS can be switched on in response to the second CTS control voltage during the charging phase associated with the second circuit path. At 1624, a source-to-gate voltage can be generated at the third CTS to facilitate generating and/or maintaining a specified overdrive voltage associated with the third CTS. This source-to-gate voltage can be $Vp_{b,k}-(Vp_{b,k}-V_{DD})$, and the specified overdrive voltage can be $V_{DD}-V_{th}$.

At 1626, during a pumping phase associated with the first circuit path, a voltage associated with a node $b_k$ can be transferred to the second gate of the second CTS to facilitate switching off the second CTS, wherein the voltage associated with the node $b_k$ can be a high level voltage.

Figure 18:
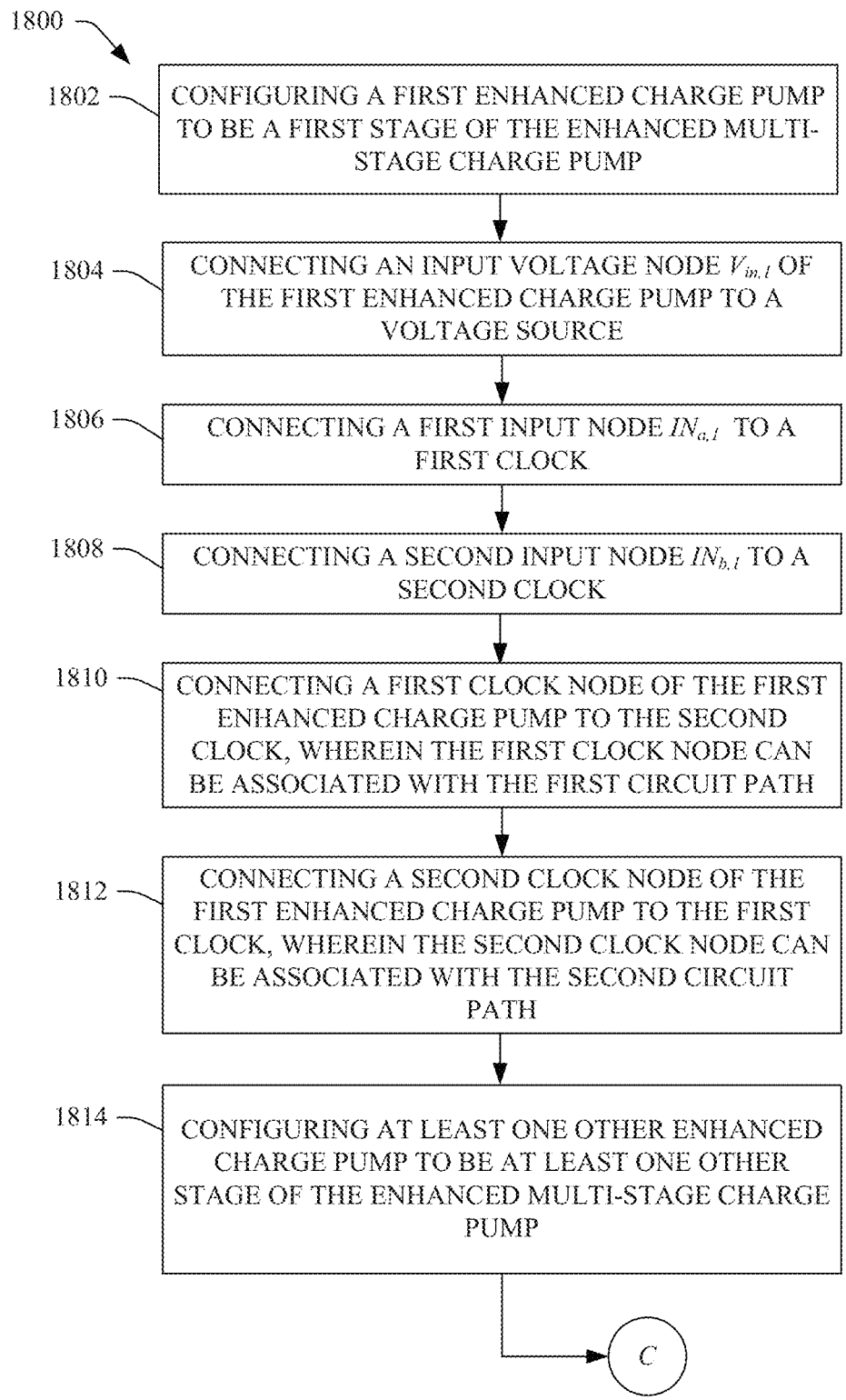
FIGS. 18 and 19 illustrate a flowchart of an example method for configuring an enhanced multi-stage charge pump in accordance with various aspects and embodiments of the disclosed subject matter.
Figure 19:
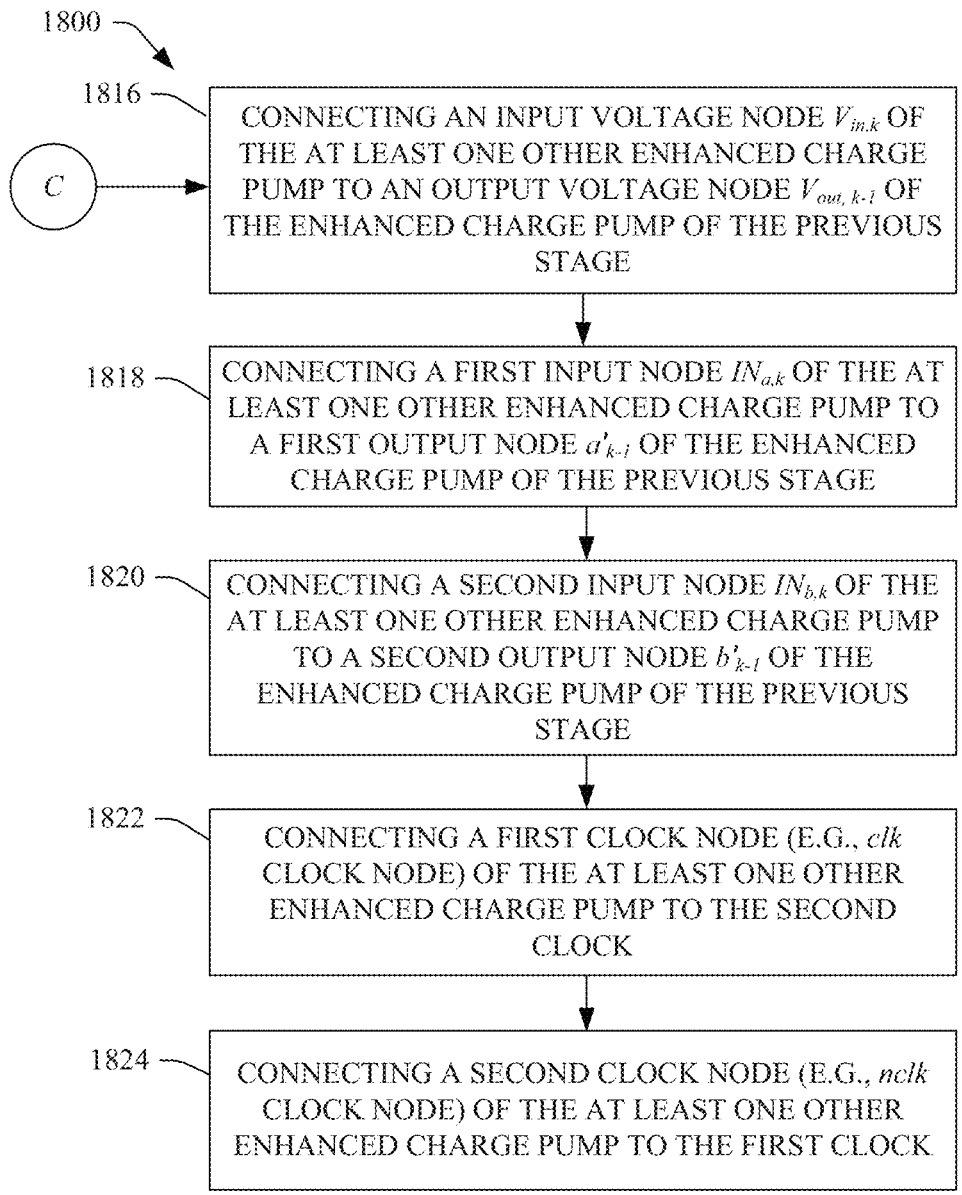

FIGS. 18 and 19 illustrate a flowchart of an example method 1800 for configuring an enhanced multi-stage charge pump in accordance with various aspects and embodiments of the disclosed subject matter. At 1802, a first enhanced charge pump can be configured to be a first stage of the enhanced multi-stage charge pump. At 1804, an input voltage node $V_{in,1}$ of the first enhanced charge pump can be connected to a voltage source. During operation of the enhanced multi-stage charge pump, the voltage source can provide a desired input or supply voltage $V_{DD}$ to the input voltage node of the first enhanced charge pump.

At 1806, a first input node $IN_{a,1}$, which can be associated with a first circuit path (e.g., circuit path a), can be connected to a first clock (e.g., first clock signal generator). In an aspect, during pump operation, the first clock can generate and provide a first clock signal (e.g., nclk) to the first input node $IN_{a,1}$. At 1808, a second input node $IN_{b,1}$, which can be associated with a second circuit path (e.g., circuit path b), can be connected to a second clock (e.g., second clock signal generator). In an aspect, during pump operation, the second clock can generate and provide a second clock signal (e.g., clk) to the second input node $IN_{b,1}$ of the first enhanced charge pump.

At 1810, a first clock node (e.g., clk clock node) of the first enhanced charge pump can be connected to the second clock (e.g., clock generating the clk signal), wherein the first clock node can be associated with the first circuit path. In an aspect, during pump operation, the second clock can generate and provide the second clock signal (e.g., clk) to the first clock node. At 1812, a second clock node (e.g., nclk clock node) of the first enhanced charge pump can be connected to the first clock, wherein the second clock node can be associated with the second circuit path. In an aspect, during pump operation, the first clock can generate and provide the first clock signal (e.g., nclk) to the second clock node of the first enhanced charge pump.

At 1814, at least one other enhanced charge pump can be configured to be at least one other stage (e.g., stage k) of the enhanced multi-stage charge pump. At this point, the method 1800 can proceed to reference point C, wherein the method 1800 can continue from reference point C, as shown in FIG. 18 and described herein.

As illustrated in FIG. 19, proceeding from reference point C to reference numeral 1816, at 1816, an input voltage node $V_{in,k}$ of the at least one other enhanced charge pump can be connected to an output voltage node $V_{out,k-1}$ (e.g., power output) of the enhanced charge pump of the previous stage. For example, if the at least one other enhanced charge pump is the second stage, the power input of the at least one other enhanced charge pump can be connected to the output voltage node of the first enhanced charge pump of the first stage. During operation of the enhanced multi-stage charge pump, the voltage at the output voltage node of the enhanced charge pump of the previous stage can provide its output voltage at $V_{out,k-1}$ to the input voltage node $V_{in,k}$ (e.g., power input node) of the at least one other enhanced charge pump.

At 1818, a first input node $IN_{a,k}$, which can be associated with a first circuit path (e.g., circuit path a) of the at least one other enhanced charge pump, can be connected to a first output node $a'_{k-1}$ of the enhanced charge pump of the previous stage. In an aspect, during pump operation, the first output node $a'_{k-1}$ can produce and provide a first output node voltage $a'_{k-1}$ to the first input node $IN_{a,k}$ of the at least one other enhanced charge pump. At 1820, a second input node $IN_{b,k}$, which can be associated with a second circuit path (e.g., circuit path b) of the at least one other enhanced charge pump, can be connected to a second output node $b'_{k-1}$ of the enhanced charge pump of the previous stage. In an aspect, during pump operation, the second output node $b'_{k-1}$ can produce and provide a second output node voltage $b'_{k-1}$ to the second input node $IN_{b,k}$ of the at least one other enhanced charge pump.

At 1822, a first clock node (e.g., clk clock node) of the at least one other enhanced charge pump can be connected to the second clock (e.g., clock generating the clk signal), wherein the first clock node can be associated with the first circuit path. In an aspect, during pump operation, the second clock can generate and provide the second clock signal (e.g., clk) to the first clock node. At 1824, a second clock node (e.g., nclk clock node) of the at least one other enhanced charge pump can be connected to the first clock, wherein the second clock node can be associated with the second circuit path. In an aspect, during pump operation, the first clock can generate and provide the first clock signal (e.g., nclk) to the second clock node of the at least one other enhanced charge pump.

Figure 20:
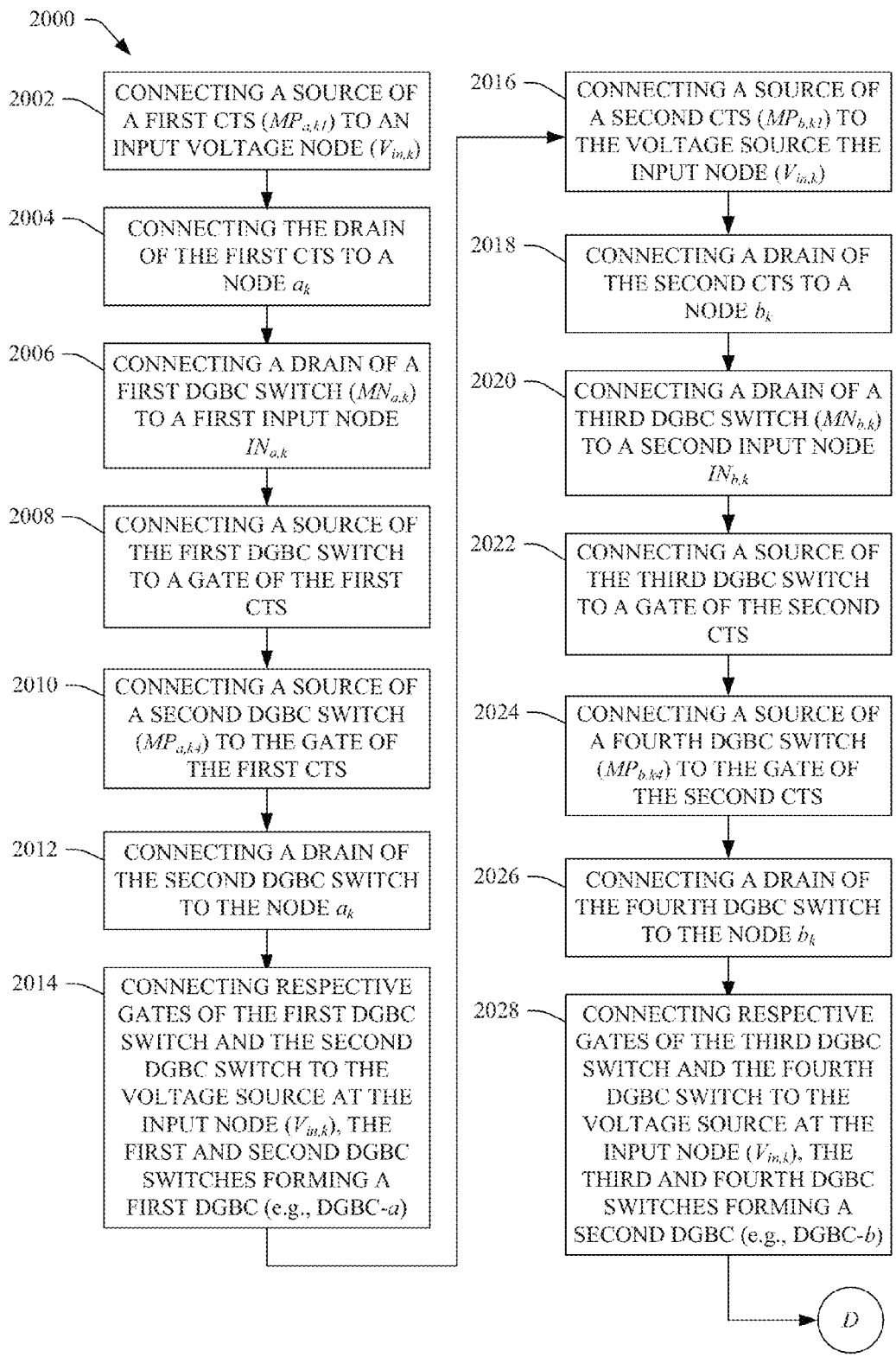
FIGS. 20, 21 and 22 present a flowchart of an example method for configuring an enhanced charge pump comprising DGBCs and AGBCs in accordance with various aspects and embodiments of the disclosed subject matter.
Figure 21:
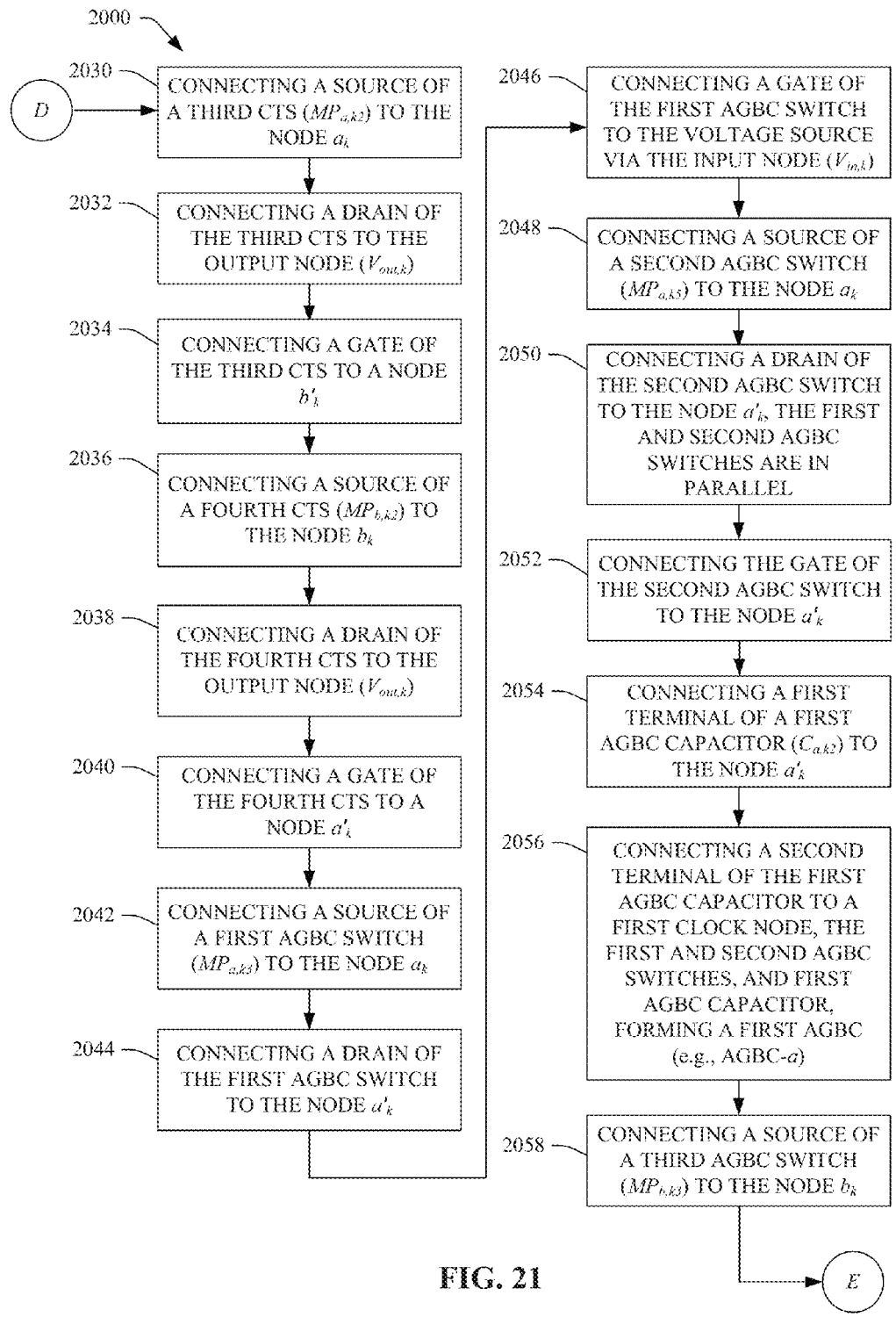

FIGS. 20 and 21 present a flowchart of an example method 2000 for configuring an enhanced charge pump comprising DGBCs and AGBCs in accordance with various aspects and embodiments of the disclosed subject matter. At 2002, the source of a first CTS ($MP_{a,k1}$) can be connected to an input voltage node ($V_{in,k}$). As desired, the input voltage node can be connected to a voltage source, which can be a standard voltage source or can be the output ($V_{out,k-1}$) of an enhanced charge pump of a previous stage, if any, of an enhanced multi-stage charge pump. At 2004, the drain of the first CTS can be connected to a node $a_k$. At 2006, a drain of a first DGBC switch ($MN_{a,k}$) can be connected to a first input node $IN_{a,k}$. At 2008, a source of the first DGBC switch can be connected to a gate of the first CTS. At 2010, a source of a second DGBC switch ($MP_{a,k4}$) can be connected to the gate of the first CTS. At 2012, a drain of the second DGBC switch can be connected to the node $a_k$. At 2014, the respective gates of the first DGBC switch and the second DGBC switch can be connected to the voltage source at the input node ($V_{in,k}$), wherein the first DGBC switch and the second DGBC switch can form a first DGBC (e.g., DGBC-a) associated with a first circuit path (e.g., circuit path a).

At 2016, a source of a second CTS ($MP_{b,k1}$) can be connected to the voltage source the input node ($V_{in,k}$). At 2018, a drain of the second CTS can be connected to a node $b_k$. At 2020, a drain of a third DGBC switch ($MN_{b,k}$) can be connected to a second input node $IN_{b,k}$. At 2022, a source of the third DGBC switch can be connected to a gate of the second CTS. At 2024, a source of a fourth DGBC switch ($MP_{b,k4}$) can be connected to the gate of the second CTS. At 2026, a drain of the fourth DGBC switch can be connected to the node $b_k$. At 2028, the respective gates of the third DGBC switch and the fourth DGBC switch can be connected to the voltage source at the input node ($V_{in,k}$), wherein the third DGBC switch and the fourth DGBC switch can form a second DGBC (e.g., DGBC-b) associated with a second circuit path (e.g., circuit path b). At this point, the method 2000 can proceed to reference point D, wherein the method 2000 can continue from reference point D, as shown in FIG. 21 and described herein.

As illustrated in FIG. 21, proceeding from reference point D to reference numeral 2030, at 2030, a source of a third CTS ($MP_{a,k2}$) can be connected to the node $a_k$. At 2032, a drain of the third CTS can be connected to the output node ($V_{out,k}$). At 2034, a gate of the third CTS can be connected to a node $b'_k$. At 2036, a source of a fourth CTS ($MP_{b,k2}$) can be connected to the node $b_k$. At 2038, a drain of the fourth CTS can be connected to the output node ($V_{out,k}$). At 2040, a gate of the fourth CTS can be connected to a node $a'_k$.

At 2042, a source of a first AGBC switch ($MP_{a,k3}$) can be connected to the node $a_k$. At 2044, a drain of the first AGBC switch can be connected to the node $a'_k$. At 2046, a gate of the first AGBC switch can be connected to the voltage source via the input node ($V_{in,k}$). At 2048, a source of a second AGBC switch ($MP_{a,k5}$) can be connected to the node $a_k$. At 2050, a drain of the second AGBC switch can be connected to the node $a'_k$, wherein the second AGBC switch can be in parallel with the first AGBC switch. At 2052, the gate of the second AGBC switch can be connected to the node $a'_k$. Alternatively, instead of the second switch being a PMOS transistor, the second AGBC switch can be a diode ($D_{a,k}$) having its positive terminal connected to the node $a_k$, and its negative terminal connected to the node $a'_k$. At 2054, a first terminal of a first AGBC capacitor ($C_{a,k2}$) can be connected to the node $a'_k$. At 2056, a second terminal of the first AGBC capacitor can be connected to a first clock node (e.g., clk node). The first clock node can be connected to a first clock (e.g., clk signal generator), for example. The first AGBC switch, second AGBC switch, and first AGBC capacitor together can form a first AGBC (e.g., AGBC-a) associated with the first circuit path.

At 2058, a source of a third AGBC switch ($MP_{b,k3}$) can be connected to the node $b_k$. At this point, the method 2000 can proceed to reference point E, wherein the method 2000 can continue from reference point E, as shown in FIG. 22 and described herein.

Figure 22:
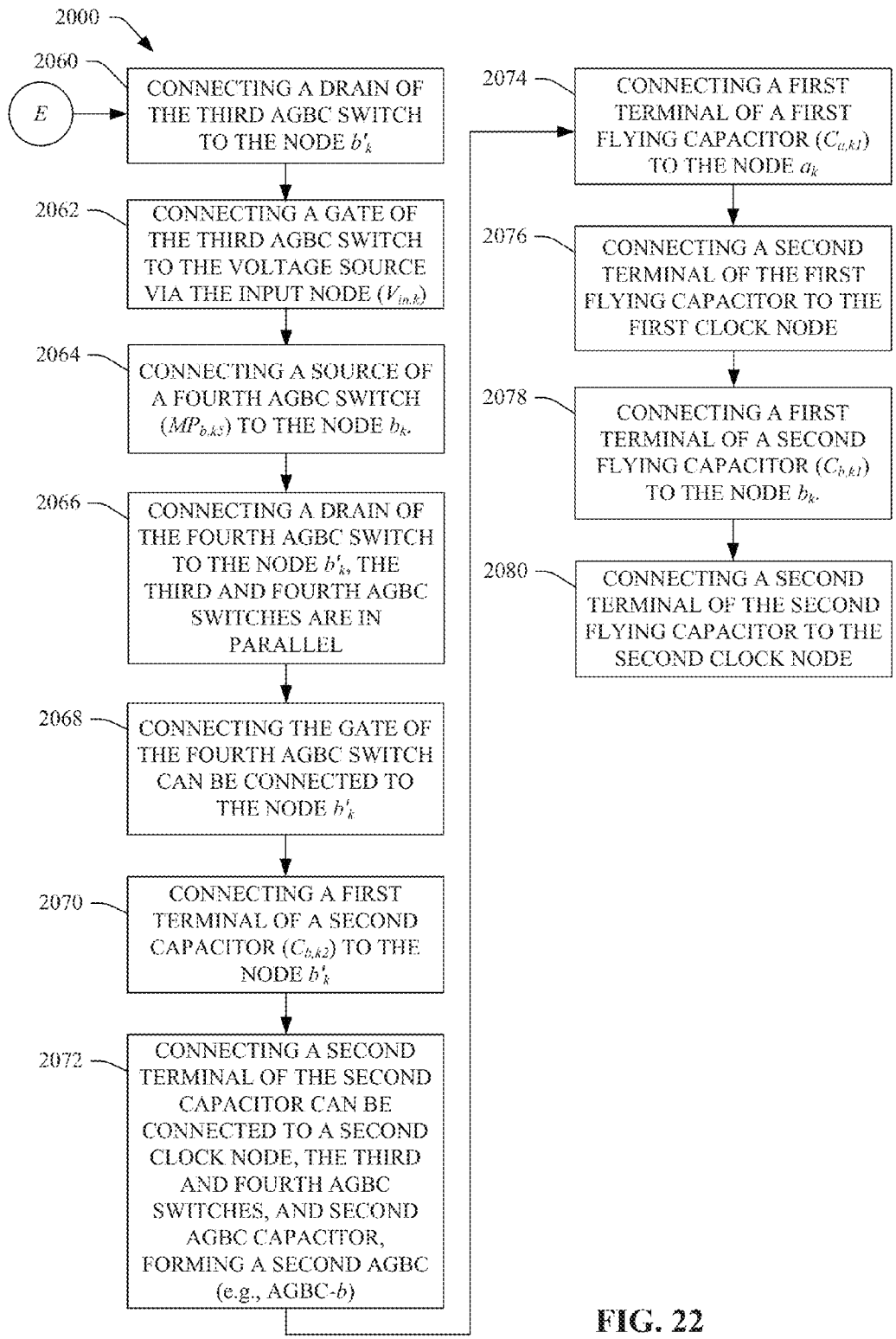

As depicted in FIG. 22, proceeding from reference point E to reference numeral 2060, at 2060, a drain of the third AGBC switch can be connected to the node $b'_k$. At 2062, a gate of the third AGBC switch can be connected to the voltage source via the input node ($V_{in,k}$).

At 2064, a source of a fourth AGBC switch ($MP_{b,k5}$) can be connected to the node $b_k$. At 2066, a drain of the fourth AGBC switch can be connected to the node $b'_k$, wherein the fourth AGBC switch can be in parallel with the third AGBC switch. At 2068, the gate of the fourth AGBC switch can be connected to the node $b'_k$. Alternatively, instead of the fourth switch being a PMOS transistor, the fourth AGBC switch can be a diode ($D_{b,k}$) having its positive terminal connected to the node $b_k$, and its negative terminal connected to the node $b'_k$.

At 2070, a first terminal of a second AGBC capacitor ($C_{b,k2}$) can be connected to the node $b'_k$. At 2072, a second terminal of the second AGBC capacitor can be connected to a second clock node (e.g., nclk node). In an aspect, the second clock node can be connected to a second clock (e.g., nclk clock signal generator) to provide a second clock signal at the second clock node. The third AGBC switch, fourth AGBC switch, and second AGBC capacitor together can form a second AGBC (e.g., AGBC-b) associated with the second circuit path.

At 2074, a first terminal of a first flying capacitor (GO can be connected to the node $a_k$. At 2076, a second terminal of the first flying capacitor can be connected to the first clock node. At 2078, a first terminal of a second flying capacitor ($C_{b,k1}$) can be connected to the node $b_k$. At 2080, a second terminal of the second flying capacitor can be connected to the second clock node.

It is to be appreciated and understood that components (e.g., charge pump (e.g., enhanced charge pump), DGBC, AGBC, switch, CTS, clock signal generator (e.g., to generate clk or nclk), capacitor, power or voltage source, resistor, etc.), as described with regard to a particular system or method, can include the same or similar functionality as respective components (e.g., respectively named components or similarly named components) as described with regard to other systems or methods disclosed herein. Various aspects or features described herein may be implemented as a method, apparatus, or article of manufacture using standard programming and/or engineering techniques.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a charge pump that includes:
        a plurality of charge transfer switches (CTSs) configured to facilitate control of charge being stored in or provided by respective flying capacitors of the charge pump;
        a dynamic gate boost component (DGBC) configured to apply a boosted gate voltage to a subset of CTSs of the plurality of CTSs at respective periodic times to facilitate control of switch states of the subset of CTSs; and
        an auxiliary gate boost component (AGBC) configured to apply a specified gate voltage to a second subset of CTSs of the plurality of CTSs at respective periodic times to facilitate control of switch states of the second subset of CTSs to facilitate generation of respective overdrive voltages associated with respective CTSs of the second subset of CTSs to maintain the respective overdrive voltages of the second subset of CTSs at voltage levels equal or substantially equal to the supply voltage associated with the charge pump.

2. The system of claim 1, wherein the AGBC comprises a first auxiliary gate boost sub-component and a second auxiliary gate boost sub-component, and the second subset of CTSs comprises a first CTS that is part of a first circuit path of the charge pump and a second CTS that is part of a second circuit path of the charge pump, and wherein the first auxiliary gate boost sub-component is part of the first circuit path and is configured to apply the specified gate voltage to the second CTS, and the second auxiliary gate boost sub-component is part of the second circuit path and is configured to apply the specified gate voltage to the first CTS.

3. The system of claim 2, further comprising:
    a multi-stage charge pump comprising a plurality of charge pumps arranged in a cascading formation, wherein the plurality of charge pumps comprises the charge pump.

4. The system of claim 3, wherein the plurality of charge pumps comprises a first charge pump and a second charge pump, wherein
    the first charge pump includes an input voltage node connected to a voltage source that is configured to provide the supply voltage, a first input node of a first stage connected to a second clock signal generator configured to provide a second clock signal, and a second input node of the first stage connected to a first clock signal generator configured to provide a first clock signal, and
    the second charge pump includes an input voltage node connected to an output voltage node of the first charge pump to receive an output voltage from the first charge pump, a first input node of a second stage connected to a first output node of the first charge pump to receive a first voltage from the first output node, a second input node of the second stage connected to a second output node of the first charge pump to receive a second voltage from the second output node, a first clock node connected to the first clock signal generator, and a second clock node connected to the second clock signal generator.

5. The system of claim 1, wherein the DGBC is further configured to control respective switch states of the subset of CTSs to facilitate generation of respective overdrive voltages associated with the respective CTSs of the subset of CTSs to maintain the respective overdrive voltages of the subset of CTSs at voltage levels equal or substantially equal to the supply voltage associated with the charge pump.

6. The system of claim 5, wherein the DGBC is further configured to facilitate generation of the respective overdrive voltages associated with the respective CTSs of the subset of CTSs, and the AGBC is further configured to facilitate generation of the respective overdrive voltages associated with the respective CTSs of the second subset of CTSs, to maintain a substantially linear output voltage-to-loading current ratio in response to the charge pump being subjected to loading currents of a specified range of current levels.

7. The system of claim 6, wherein the specified range of current levels of the loading currents comprises a loading current of greater than 60 microamps.

8. The system of claim 1, wherein the AGBC is further configured to comprise:
a first switch configured to switch to an on state during a pumping phase of a flying capacitor associated with a same circuit path as the first switch and switch to an off state during a charging phase of the flying capacitor to maintain a constant voltage at a first output node of the charge pump during the charging phase of the flying capacitor;
a second switch configured to be in parallel with the first switch in an electronic circuit, and to operate to ramp up output voltage of the charge pump during an initialization phase of the charge pump; and
a capacitor configured to be connected to a first clock node associated with a first clock signal generator, and connected to the first switch and the second switch at the first output node.

9. The system of claim 8, wherein the first switch is a P-type Metal-Oxide-Semiconductor field-effect transistor (PMOS) type transistor, and the second switch is one of a diode-connected PMOS transistor or a diode.

10. The system of claim 1, wherein the DGBC further comprises:
a first switch configured to switch to an on state during a charging phase of a flying capacitor associated with a same circuit path as the first switch; and
a second switch configured to switch to an off state during the charging phase of the flying capacitor, wherein, in response to the first switch being in the on state and the second switch being in the off state, the DGBC is configured to transfer a low voltage to a gate of a first CTS of the subset of CTSs to switch the first CTS to an on state, wherein the first CTS has a source-to-gate voltage equal to the supply voltage.

11. The system of claim 10, wherein, during a pumping phase of the flying capacitor, the first switch is configured to switch to an off state and the second switch is configured to switch to an on state to facilitate transfer of a high voltage to the gate of the first CTS to switch the first CTS to an off state.

12. The system of claim 10, wherein at least one of the first switch or the second switch is smaller in size than the first CTS.

13. The system of claim 1, wherein the plurality of CTSs is four CTSs that are each P-type Metal-Oxide-Semiconductor field-effect transistor (PMOS) type transistors.

14. The system of claim 1, wherein the charge pump is a two-phase cross-coupled capacitor-switched charge pump.

15. The system of claim 1, wherein a body of at least one CTS of the plurality of CTSs is further configured to be connected to a drain terminal of the at least one CTS to facilitate reduction of a threshold voltage of the at least one CTS.

16. A method, comprising:
controlling a switching state of a first charge transfer switch (CTS) of a plurality of CTSs of a charge pump by a first dynamic gate boost component (DGBC) in response to a first voltage level received by the first DGBC;
controlling a switching state of a second CTS of the plurality of CTSs by a second DGBC in response to a second voltage level received by the second DGBC, wherein the controlling of the switching state of the first CTS and the controlling of the switching state of the second CTS facilitates generating a higher output voltage at the output of the charge pump based at least in part on an input voltage received by the charge pump, wherein the input voltage is a lower voltage level than the higher output voltage;
controlling a switching state of a third CTS of the plurality of CTSs by a first auxiliary gate boost component (AGBC) in response to a voltage level of a first clock signal received by the first AGBC; and
controlling a switching state of a fourth CTS of the plurality of CTSs by a second AGBC in response to a voltage level of a second clock signal received by the second AGBC, wherein first AGBC and the fourth CTS are associated with a first circuit path, and the second AGBC and the third CTS are associated with a second circuit path, and wherein the controlling of the switching state of the third CTS and the controlling of the switching state of the fourth CTS facilitates generating respective overdrive voltages associated with the third CTS and the fourth CTS.

17. The method of claim 16,
wherein the controlling the switching state of the first CTS further comprises controlling the switching state of the first CTS by the first DGBC, in response to the first voltage level received by the first DGBC that facilitates applying a boosted gate voltage to the first CTS at periodic times to facilitate the controlling of the switching state of the first CTS, to facilitate generating an overdrive voltage associated with the first CTS to maintain the overdrive voltage associated with the first CTS at a voltage level that is equal or substantially close to being equal to a supply voltage associated with the charge pump; and
wherein the controlling the switching state of the second CTS further comprises controlling the switching state of the second CTS by the second DGBC, in response to the second voltage level received by the second DGBC that facilitates applying another boosted gate voltage to the second CTS at other periodic times to facilitate the controlling of the switching state of the second CTS, to facilitate generating another overdrive voltage associated with the second CTS to maintain the other overdrive voltage associated with the second CTS at a voltage level that is equal or substantially close to being equal to the supply voltage.

18. The method of claim 17, further comprising:
respectively controlling the switching states of the first CTS, the second CTS, the third CTS, and the fourth CTS to maintain the respective overdrive voltages at voltage levels equal or substantially close to being equal to the supply voltage associated with the charge pump to maintain a substantially linear output voltage-to-loading current ratio in response to the charge pump being subjected to loading currents of a specified range of current levels.

19. The method of claim 18, wherein the specified range of current levels of the loading currents comprises a loading current of greater than 60 microamps.

20. The method of claim 16, further comprising:
during a charging phase associated with the first circuit path,
transferring a first input voltage associated with the first circuit path to a first gate of the first CTS to facilitate switching on the first CTS and charging a first flying capacitor, wherein the first input voltage is a low voltage level,
producing a first CTS control voltage, applying the first CTS control voltage to a fourth gate associated with the fourth CTS to facilitate controlling switching of the fourth CTS, switching on the fourth CTS in response to the first CTS control voltage, generating a specified source-to-gate voltage at the fourth CTS to facilitate generating a specified overdrive voltage associated with the fourth CTS; and during a pumping phase associated with the second circuit path, transferring a voltage associated with a first CTS control node to the first gate of the first CTS to facilitate switching off the first CTS, wherein the voltage associated with the first input node is a high voltage level.

21. The method of claim 20, further comprising:

during a charging phase associated with the second circuit path, transferring a second input voltage to the second gate of the second CTS to facilitate switching on the second CTS and charging a second flying capacitor, wherein the second input voltage is a low voltage level, producing a second CTS control voltage at a second CTS control node, applying the second CTS control voltage to a third gate associated with a third CTS to facilitate controlling switching of the third CTS, switching on the third CTS in response to the second CTS control voltage, generating a source-to-gate voltage at the third CTS to facilitate generating a specified overdrive voltage associated with the third CTS; and during a pumping phase associated with the first circuit path, transferring a voltage associated with a second CTS control node to the second gate of the second CTS to facilitate switching off the second CTS, wherein the voltage associated with the second CTS control node is a high voltage level.

22. The method of claim 16, further comprising:

forming a multi-stage charge pump comprising the charge pump and at least one other charge pump;

connecting a voltage input node of the charge pump to a voltage source;

connecting a first input node of the charge pump to a first clock, wherein the first input node is associated with a first circuit path;

connecting a second input node of the charge pump to a second clock, wherein the second input node is associated with a second circuit path;

connecting a first clock node of the charge pump to the second clock, wherein the first clock node is associated with the first circuit path; and connecting a second clock node of the charge pump to the first clock, wherein the second clock node is associated with the second circuit path.

23. The method of claim 22, further comprising:

connecting an input voltage node of the at least one other charge pump to an output voltage node of the charge pump of the previous stage;

connecting a first input node of the at least one other charge pump to a first output node of the charge pump, wherein the first input node is associated with a first circuit path of the at least one other charge pump;

connecting a second input node to a second output node of the charge pump of the previous stage, wherein the second input node is associated with a second circuit path of the at least one other charge pump;

connecting a first clock node of the at least one other charge pump to the second clock, wherein the first clock node is associated with the first circuit path of the at least one other charge pump; and connecting a second clock node of the at least one other charge pump to the first clock, wherein the second clock node is associated with the second circuit path of the at least one other charge pump.

24. A charge pump, comprising:

a plurality of charge transfer switches (CTSs) configured to respectively switch between an off state and an on state to facilitate control of charge being stored in or provided by respective flying capacitors of the charge pump;

a dynamic gate boost component configured to apply a boosted gate voltage to a subset of CTSs of the plurality of CTSs at respective periodic times to respectively switch respective CTSs in the subset of CTSs between the off state and the on state to facilitate generation of respective overdrive voltages associated with respective CTSs of the subset of CTSs to facilitate maintaining the respective overdrive voltages of the respective CTSs of the subset of CTSs at voltage levels equal or substantially equal to a supply voltage provided to the charge pump; and an auxiliary gate boost component configured to apply a specified gate voltage to a second subset of CTSs of the plurality of CTSs at respective time periods to facilitate control of switch states of the second subset of CTSs to facilitate maintaining the respective overdrive voltages of the second subset of CTSs at voltage levels equal or substantially equal to the supply voltage.

* * * * *